United States Patent [19]

Kraul et al.

[11] 4,414,676
[45] Nov. 8, 1983

[54] SIGNAL SYNCHRONIZATION SYSTEM

[75] Inventors: Douglas R. Kraul, Sunrise, Fla.;
James W. Marshall, State College, Pa.

[73] Assignee: Motorola, Inc., Schaumburg, Ill.

[21] Appl. No.: 249,512

[22] Filed: Mar. 31, 1981

[51] Int. Cl.$^3$ .............................................. H04L 7/00
[52] U.S. Cl. .................................. 375/116; 364/728; 340/146.2; 375/119
[58] Field of Search .................... 340/146.2, 146.3 R, 340/146.3 Z, 146.3 WD; 370/100, 105, 106; 371/42; 375/106, 111, 114, 116, 118; 364/701, 702, 728, 819, 514

[56] References Cited

U.S. PATENT DOCUMENTS

| | | | |
|---|---|---|---|
| 3,654,390 | 4/1972 | Puckette | 375/116 |
| 3,777,130 | 12/1973 | Croisier et al. | 364/724 |
| 3,842,399 | 10/1974 | Kneuer et al. | 371/69 |
| 3,881,101 | 4/1975 | Pederson et al. | 364/728 |
| 3,940,558 | 2/1976 | Gabbard et al. | 375/107 |
| 3,952,254 | 4/1976 | Kurita et al. | 328/63 |
| 3,961,171 | 6/1976 | Freeman | 340/146.2 |
| 3,978,285 | 8/1976 | Tan et al. | 375/119 |
| 4,027,100 | 5/1977 | Ishiguro | 375/114 |
| 4,029,900 | 6/1977 | Addeo | 375/114 |
| 4,032,885 | 6/1977 | Roth | 340/146.2 |
| 4,034,352 | 7/1977 | Hotchkiss | 364/200 |
| 4,168,529 | 9/1979 | Tomlinson | 364/728 |
| 4,203,002 | 5/1980 | Nossen | 375/116 |
| 4,209,834 | 6/1980 | Rabow | 364/728 |

FOREIGN PATENT DOCUMENTS 2813531  10/1978  Fed. Rep. of Germany .

OTHER PUBLICATIONS

"New Radio Paging System", M. Komura, A. Yokokura, T. Hagihira & M. Ogasawara, TELOCATOR, Mar. 1978, pp. 26-34.
"Optimization of the Performance of a Digital-Data--Tramsition Tracking Loop", M. Simon, IEEE Transactions on Communication Technology, Oct. 1970, pp. 686-689.
"Digital Data-Transition Tracking Loops", W. Lindsey & R. Tausworthe, JPL Space Programs Summary 37-50, vol. III, pp. 272-276.
"An Analysis of the Steady-State Phase Noise Performance of a Digital Data-Transition Tracking Loop", M. Simon, JPL Space Programs Summary 37-50, vol. III, pp. 54-62.

Primary Examiner—Benedict V. Safourek
Attorney, Agent, or Firm—Joseph T. Downey; Edward M. Roney; James W. Gillman

[57] ABSTRACT

A signal synchronization system is disclosed which samples an incoming stream containing binary information at a sampling rate which is an integral multiple of the bit information rate. This system correlates the sequences of the sampled bit pattern with a predetermined sequence to produce a measure of the dissimilarity between the sampled and the predetermined sequences. Synchronization of a local sampling clock with the incoming binary information is achieved by making phase adjustments to the local sampling clock which are functions of both the magnitude of dissimilarity and the time of measurement.

16 Claims, 11 Drawing Figures

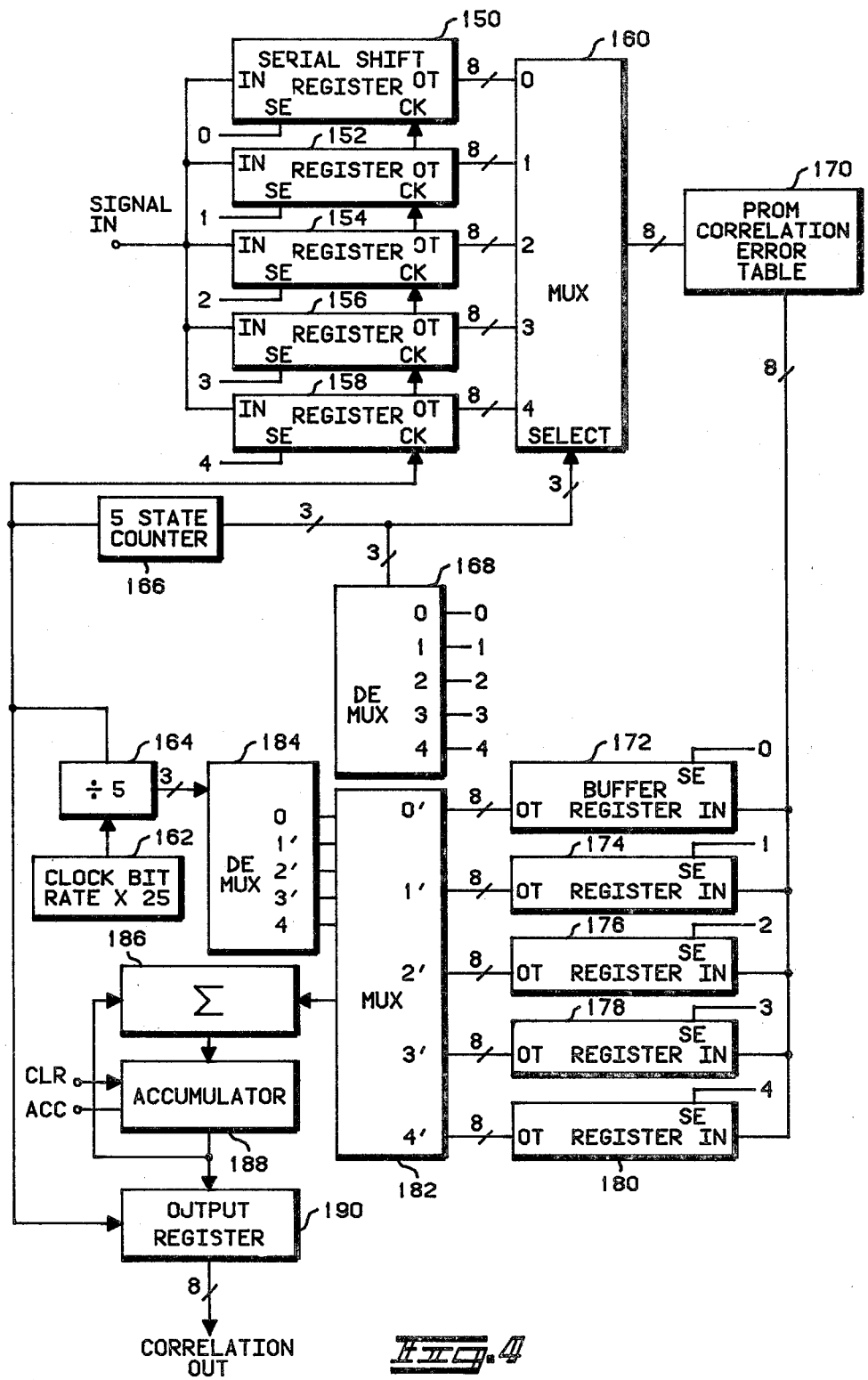

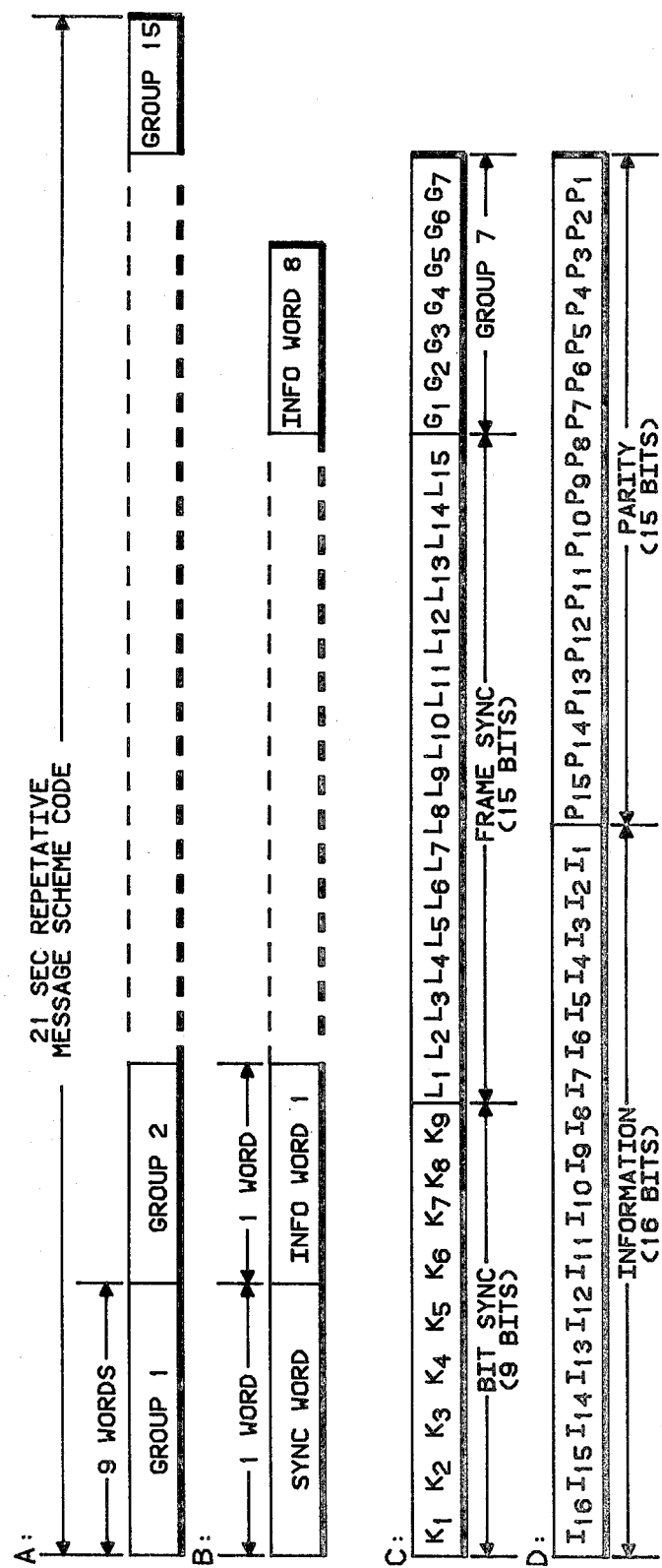

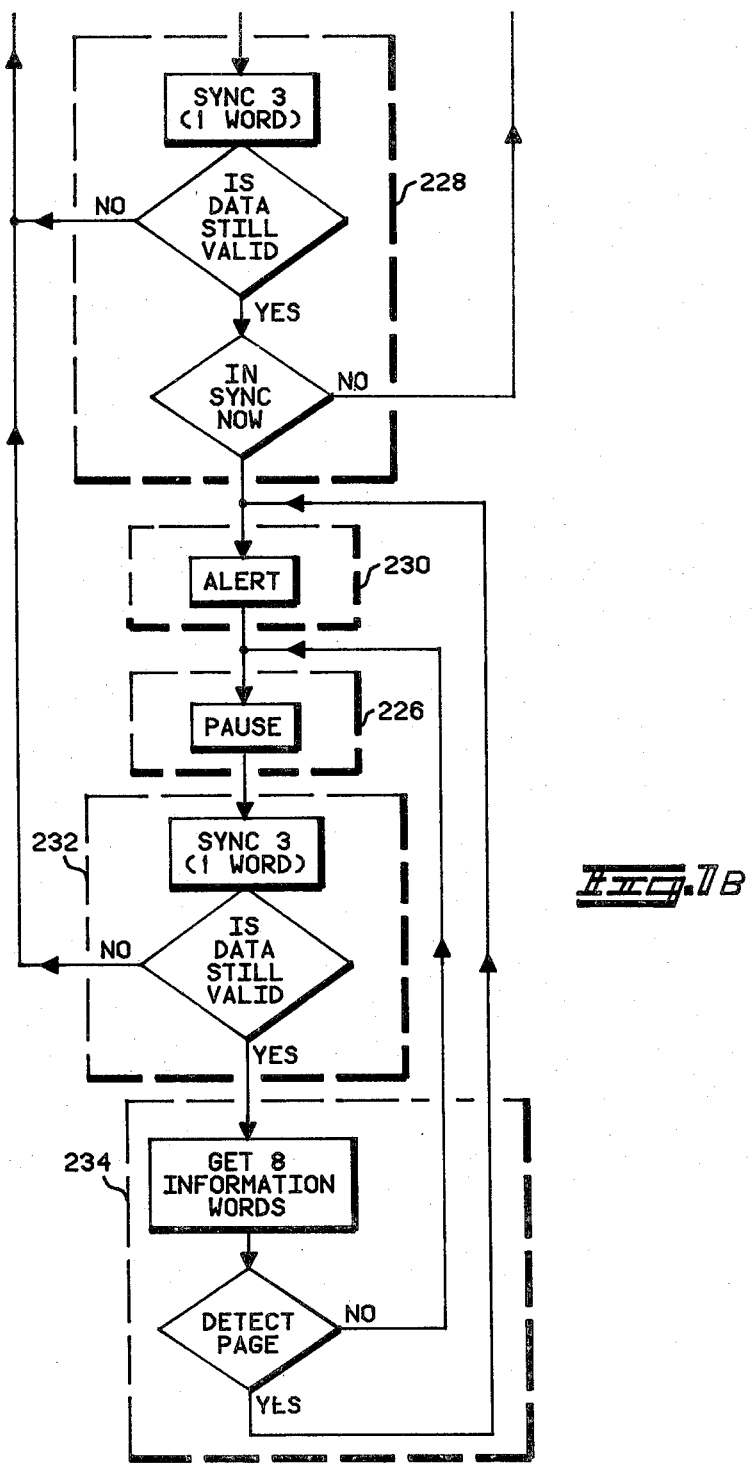

SIGNAL SYNCHRONIZATION SYSTEM

BACKGROUND OF THE INVENTION

1. Field of the Invention

This invention relates generally to the field of signal synchronization systems and in particular to a signal synchronization system in which predetermined adjustments are made as a function of the time sample and the degree of dissimilarity between incoming and reference signals.

2. Description of the Prior Art

Signal synchronization systems for analog signals are well known in the art and, perhaps the best known systems are employed to control the tuning frequency for radio receivers. A phase lock loop circuit containing a voltage control oscillator would normally compare frequency with that of a master oscillator. Any drift of the voltage controlled oscillator frequency is detected by a phase comparator and the resulting error voltage provides a signal to adjust the voltage controlled oscillator and correct the frequency. The magnitude of the error signal is directly proportional to the phase difference between the signals and thus, synchronization may be maintained.

There have been many variations of prior art phase lock loop circuits which have been applied to processing incoming signals containing information in a digital format. The usual requirement in such systems is to synchronize a local clock with an external system clock so that correct decoding of digital information may be achieved. Such a system would be similar to a radio receiver tuning control circuit in which the voltage controlled oscillator is replaced by a local clock and phase adjustment circuit operating so that instead of modifying an oscillator's frequency, the local clock is adjusted to achieve time synchronization with the incoming signal.

As shown in the block diagram of FIG. 1, a data input line is supplied to a phase detector, which operates to determine the phase difference between the local clock and the incoming data signal. Such phase lock loop systems frequently include a transfer function circuit for modifying the effect of the error signal to achieve a predetermined functional relationship in the response of the system. The transfer function circuit is frequently designated as a weighting circuit and may include some time delay. The modified function is then applied to a sample and hold device which allows adjustments to be made to a system only at specific time periods. A separate timing circuit would normally determine when the modified adjustment will be applied to the phase adjuster to alter the local clock signal timing. The phase adjuster provides a recovered clock signal which is supplied to the phase detector.

The problems with such prior art circuits are several including the detection and distinguishing of digital signal levels which are usually in binary form, the effect of noise in the signal, and the cumulative effect of past adjustments. It is also difficult to determine the beginning and ending of a bit interval and the inclusion of the sample and hold feature is for the purpose of applying corrections only at selected intervals which ideally correspond to the edges defining a bit interval.

Another form of phase lock loop circuit which has been employed for synchronization utilizes differentiation techniques for the purpose of detecting the occurrence of edges of bit intervals. Normally, such systems rely in the detection of a repetitive ∅ and 1 level signal pattern of sufficient length to allow the system to identify the occurrence of edges and to achieve synchronization of the local clock system with respect to the incoming bit edge sequence. The difficulties with the edge detection synchronization systems are that a ∅ and 1 synchronization bit pattern must ordinarily be imposed on the incoming signal so that a sufficient number of distinct uniformly spaced edges can be provided to achieve synchronization; the presence of noise during the reception of this critical synchronization bit pattern can destroy the synchronization attempt; and simple drift in the local clock can result in a loss of synchronization.

Some additional prior art systems which attempt to reduce the problem by including a recovery circuit to maintain functioning if synchronization is not achieved within the time span of the repetitive ∅ and 1 sequence or is subsequently lost have local clocks which can be synchronized in phase with broadcast system clocks, and thereby normally function is slave units, but can also function as a master clock in the event that synchronization is lost. The principal problem with such systems is that for digital information being broadcast in a synchronous format, having a local clock operating as a master clock can only be advantageous if the local clock has indeed been synchronized to the system clock and does not exhibit any drift with time and if the disruption interval is quite short.

SUMMARY OF THE INVENTION

It is an object of the present invention to provide an improved signal synchronization system.

It is another object to provide a signal synchronization system in which adjustments are a function of both time and the magnitude of dissimilarity between signals.

It is a further object to provide a signal synchronization system which adjusts timing to achieve synchronization which is responsive to the cumulative effect of past adjustments.

The present invention encompasses a signal synchronization system which comprises local signal means producing an output signal, pattern analyzing means receiving first and second signals and producing a control signal in response thereto with the control signal being related to the dissimilarity between the first and second signals. Also included are timing means producing regular timing signals and adjustment means coupled to the timing means and responsive to both control signals from the pattern analyzing means and to the timing signals from the timing means, for adjusting the time occurrence of the output signals of the local signal means as a function of predesignated characteristics of the control signal and the timing signals. The present invention also encompasses more specifically a digital synchronization system which relies on repetitive sampling occurring at a sufficient rate to give several data samples during an anticipated bit interval period. Each of these samples is processed and combined with the output of a sequence correlator which determines the difference between the information contained in the sequence of the sampled incoming digital signal and a predetermined reference bit sequence. The sampling clock system adjustment is based on the derived information of the magnitude of the difference between the known and received bit sequence and the sample time period during which this information is derived. The magnitude of the difference and the sample period each constitutes an independent variable. A memory is accessed by two independent variables, to provide the predetermined correction to achieve synchronization of the sampling clock. The predetermined correction which is to be applied is made to be dependent upon the cumulative effect of the recent history of adjustments. The synchronization function of the device eventually adjusts the sampling clock so that the minimum bit sequence error is achieved at a central sampling interval substantially corresponding to the central of the anticipated bit interval.

BRIEF DESCRIPTION OF THE DRAWINGS

Features of this invention which are believed to be novel are set forth with particularity in the appended claims. The invention itself, however, together with its further objects and advantages thereof, may be best understood by reference to the following description, when taken in conjunction with the accompanying drawings, in which:

FIG. 4 is a functional block diagram for an alternative embodiment of a signal correlator for the present invention.

FIG. 6 is a diagram of the digital signal format for the alternative embodiment of the invention.

FIGS. 7A and 7B comprise a single flowchart of the entire firmware program for the alternative embodiment of the invention.

DESCRIPTION OF THE PREFERRED EMBODIMENT

Figure 1:
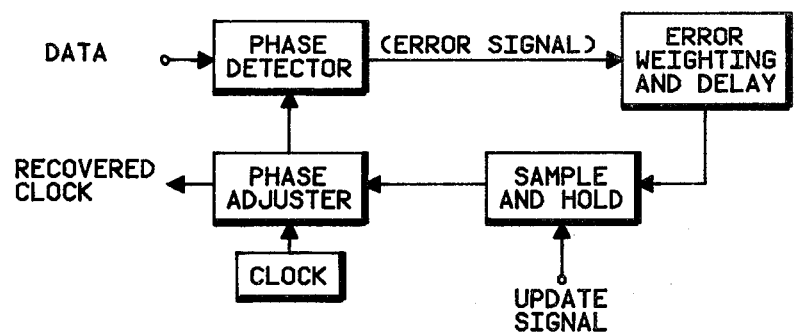
FIG. 1 is a functional block diagram showing prior art synchronization systems.
Figure 2A:
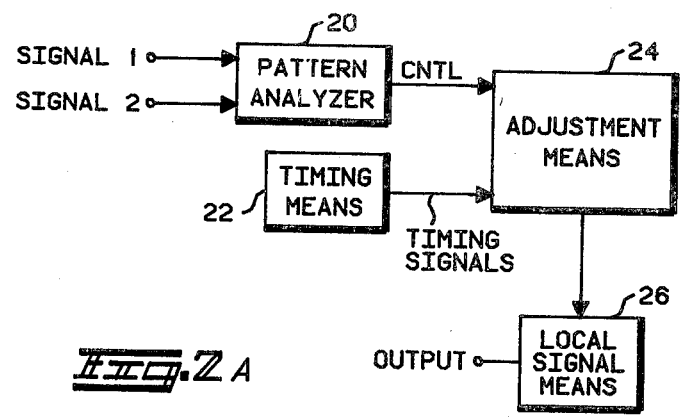
FIG. 2A is a functional block diagram of the synchronization system for the preferred embodiment of the present invention.

Referring now more particularly to the drawings, FIG. 2A shows a functional block diagram of the synchronization system for the preferred embodiment of the present invention. A pattern analyzer 20 receives two input signals, designated signal 1 and signal 2. The function of pattern analyzer 20 is to compare the signal patterns of signal 1 and signal 2 and produce a control signal which is related to the measured differences or dissimilarity between the two incoming signals. A timing means 22 generates regular timing signals. Adjustment means 24 is coupled to a local signal means 26 and receives the control signal from pattern analyzer 20 and timing signals generated by timing means 22. Adjustment means 24 produces an adjustment signal which is a function of the control signal and timing signals. A local signal means 26 produces an output signal which is adjusted by an adjustment signal from adjustment means 24.

When signal 1 and signal 2 are applied to pattern analyzer 20 a control signal is produced. This control signal in conjunction with timing signals of timing means 22 constitute two independent variables which are provided to adjustment means 24 and determine the characteristics of the adjustment signal which will be supplied to local signal means 26. The output signal of adjustment means 24 is a function of the two independent variables of its input signals. Local signal means 26 produces an output signal which is then adjusted in time by the output signal of adjustment means 24. Thus the local signal means output signal, as a function of time, is controlled by adjustment means 24. Thus the synchronization which occurs is in the timing of the output signal of local signal means 26 as a function of the difference between signal 1 and signal 2 and time as independent parameters. Thus, it may be advanced or retarded by any magnitude.

Figure 2B:
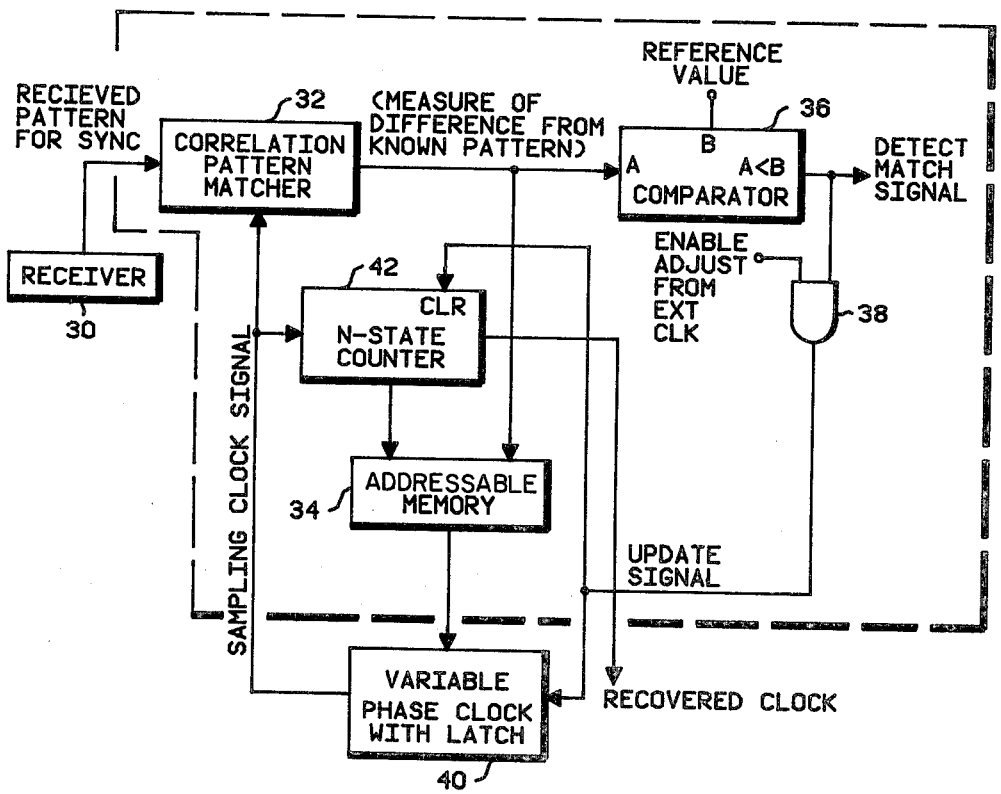
FIG. 2B is a more detailed functional block diagram for the preferred embodiment of the present invention.

FIG. 2B is a more detailed block diagram of the synchronization system for the preferred embodiment operating in discrete time. It has been additionally modified to show more details of the preferred embodiment. A receiver 30 receives a single incoming signal. Receiver 30 may be either a hard wire connection or a type of communication receiver detecting transmitted information. Receiver 30 is connected to a correlation pattern matcher 32 which corresponds to pattern analyzer 20. However, the signal provided to correlation pattern matcher 32 is preferably a binary digital pattern. A second signal input to correlation pattern matcher 32 is not shown in this more detailed diagram since the pattern is a predetermined signal and it is more convenient to provide pattern matcher 32 with an internal second signal against which the correlation is performed. The output signal of correlation pattern matcher 32 is supplied to an addressable memory 34 and to a comparator 36. This output signal measures the difference or dissimilarity between the incoming signal pattern and the internally stored or generated predetermined signal pattern. This difference may be a discrete value as in the case of differences between binary digit sequences or it may be a continuously variable difference signal for two generalized signal patterns.

Comparator 36 receives a reference value signal for assessment of the magnitude of the difference or dissimilarity from correlation pattern matcher 32. An output of comparator 36 under the condition that the difference magnitude from a known pattern is less than the reference value is designated as Detect Match Signal which is supplied to an AND gate 38. AND 38 also receives an Enable Adjust Signal from an external clock. The signal at the output of AND 38 will eventually allow updating the adjustments to achieve synchronization at predetermined time intervals as determined by the external clock. The use of the term external clock is merely to distinguish this clock operation from the equivalent of timing means 22. The output of AND 38 is connected to a variable phase clock 40 and to a clear terminal of an N-state counter 42. A first output of N-state counter 42 is connected to addressable memory 34. The output of addressable memory 34 is connected to variable phase clock 40. The output of variable phase clock 40 is designated as Sampling Clock Signal and is applied to a second input of N-state counter 42 and to a second input of correlation pattern matcher 32. At a second output terminal of N-state counter 42 is a signal designated Recovered Clock which corresponds to the time for an anticipated bit interval edge.

When a signal is received and detected by receiver 30 it is supplied to correlation pattern matcher 32 where it is correlated with an internally stored or generated predetermined pattern. The output of the correlation pattern matcher 32 is a signal which is a measure of the difference or dissimilarity between the incoming signal detected by receiver 30 and the predetermined signal pattern. This output signal is applied to addressable memory 34 and serves as one independent variable to partially designate a corresponding adjustment signal defined by a specific functional relationship. In the case of the preferred embodiment it is convenient for the purposes of this description to use a binary signal pattern as the received pattern and correspondingly the predetermined pattern for correlation will also be a binary sequence. The output signal from correlation pattern analyzer 32 is then a discrete value which addresses a range of locations within addressable memory 34.

In a similar manner, N-state counter 42 corresponds to timing means 22 and it is convenient to describe its function terms of discrete timing signals or intervals relating to the counting states of the counter. The outputs of N-state counter 42 are timing signals which form the second independent variable supplied to an adjustment means to determine the functional relationship. In the present case, the discrete timing signals specify a range of addresses of locations in addressable memory 34 for the value for the functionally related adjustment signal. An output of N-state counter 42 is connected to memory 34 and along with the control signal complete the designation of a unique addressable location contained in addressable memory 34. The information contained in the various locations of addressable memory 34 can only be accessed by the various combinations of the signal from N-state counter 42 and the output signal from correlation pattern matcher 32. The information contained in addressable memory 34 comprises the discrete corrections with magnitude and direction which will be applied to variable phase clock 40. Although described as a discrete system, it is clear that any functional relationship can be made using the timing and dissimilarity signals as independent variables.

Comparator 36 provides an output signal which indicates that a sufficient correlation has been achieved so that a match in the patterns may be said to have been detected. This requires a predetermined value which is deemed sufficient for synchronization purposes in this case if the measure of the difference from the known pattern is A, then the predetermined reference magnitude is B. This value is the largest difference which is acceptable. Thus, whenever A is less than B, a signal is produced indicating that sufficient correlation has been detected. This is consistent with the normal concept of correlation.

It is convenient to combine the Detect Match Signal with an appropriate time signal at the inputs to AND 38 to generate an Update signal. This Update Signal enables the variable phase clock 40 to apply the correction to alter the timing of its sampling clock signal by the correction stored in addressable memory 34. The Update signal is also coupled to N-state counter 42 to provide clearing that counter so that it may restart its counting operation. As will be described in more detail later, the various states of N-state counter 42 correspond to the finite time intervals into which an anticipated bit interval will be divided with the sampling clock signal supplied to N-state counter actuating each state.

Although may other possible combinations of the independent variables could be suitable, it may be seen that the correction to the variable phase clock is a function of both the detected difference or dissimilarity between the incoming signal and the known pattern and the time at which this difference is determined. Therefore, the corrections which are applied to the variable phase clock are a function of two independent variables, namely the sampling time position within an anticipated interval and the magnitude of the sampled difference between incoming and known signals.

Figure 3A:
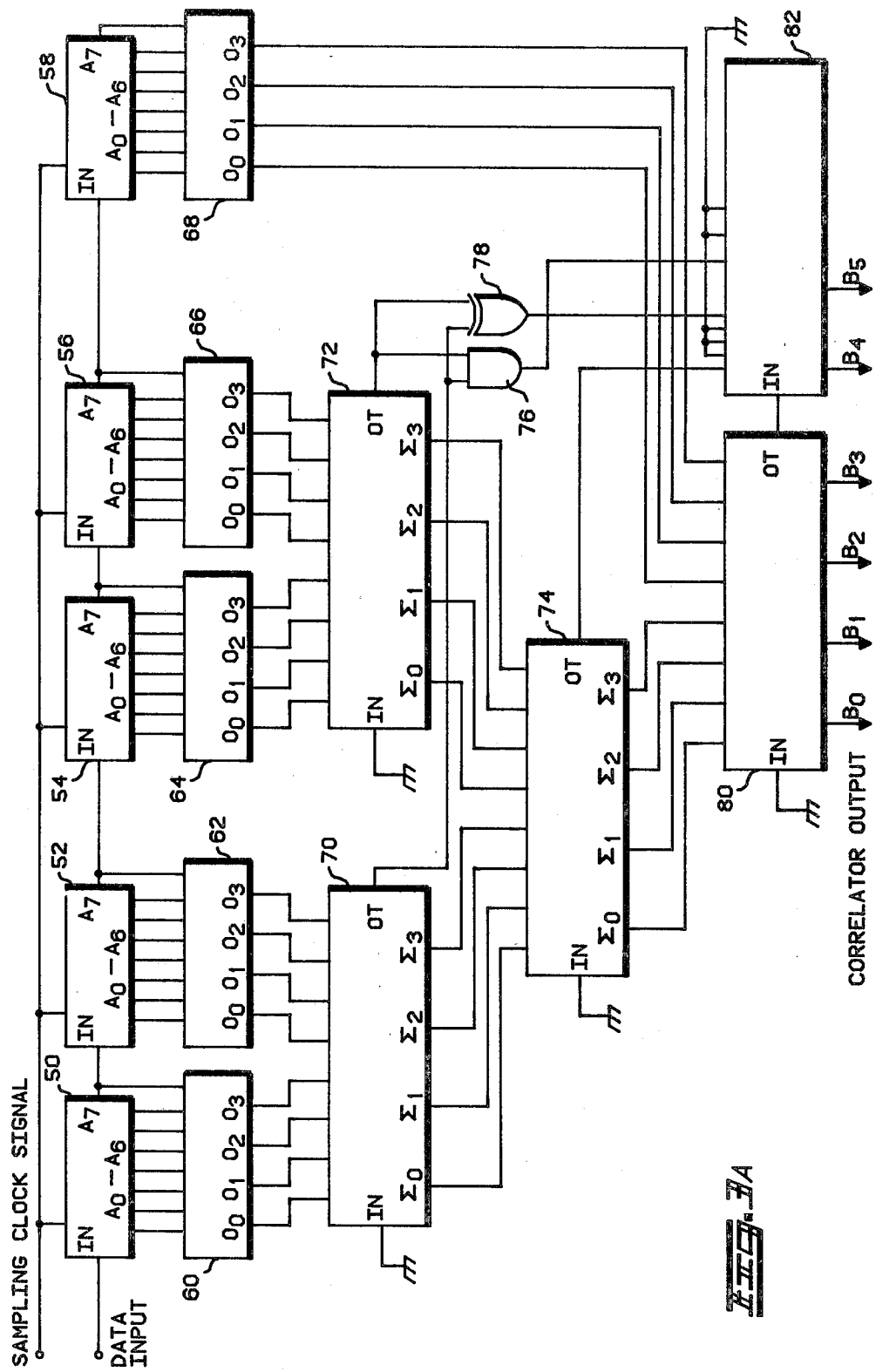
FIGS. 3A and 3B are detailed electrical schematics of the synchronization apparatus for FIG. 2B.
Figure 3B:
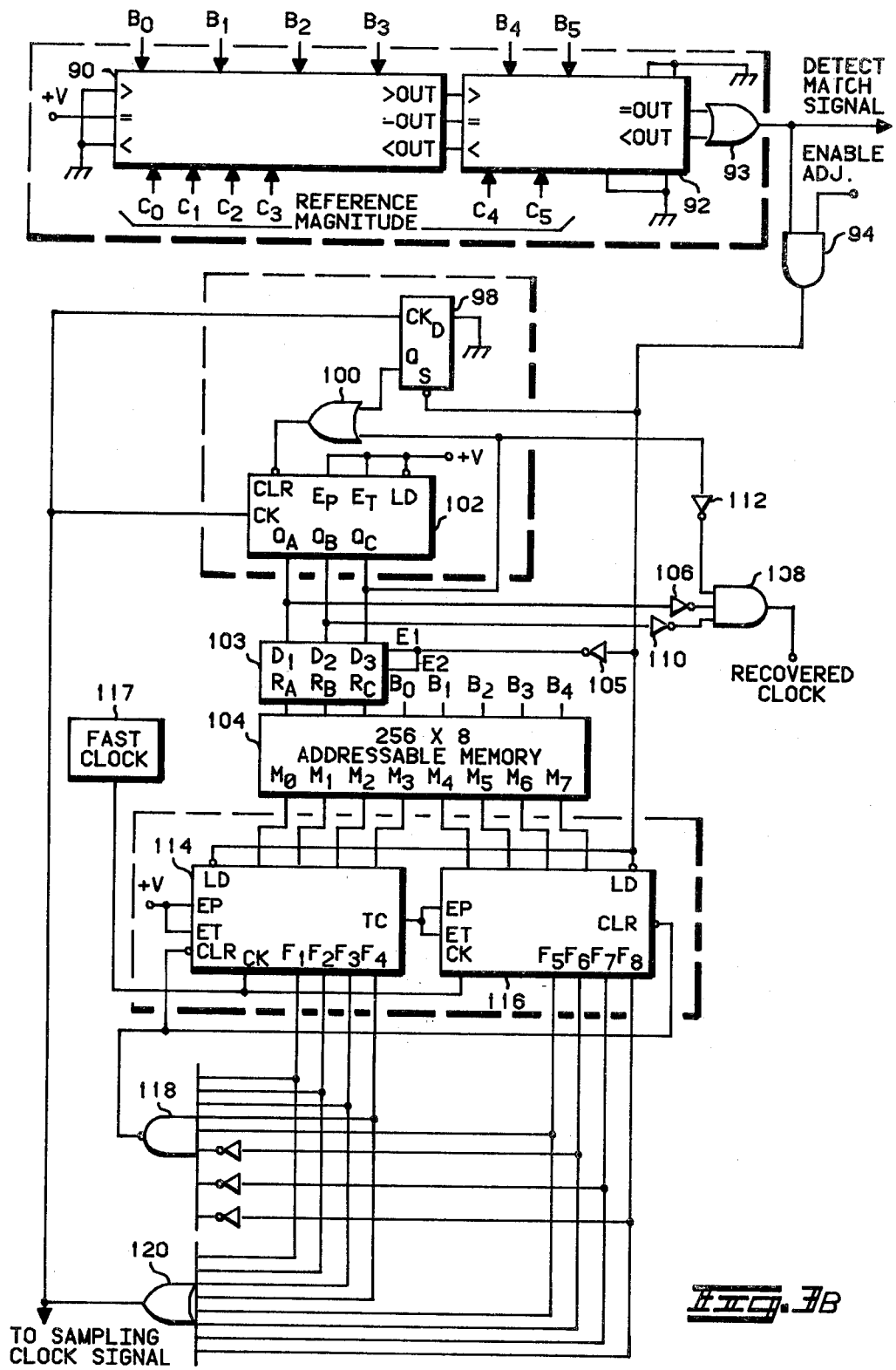

FIGS. 3A and 3B, in combination, show the detailed electrical schematic diagram for a first embodiment of the synchronization system of FIG. 2B. A sampling clock signal is applied to the clock input terminals of a series arrangement of five eight bit serial shift registers having parallel outputs designated, respectively, 50, 52, 54, 56 and 58. A data input signal which comprises a sampled received signal pattern for synchronization is applied to the data input terminal of serial shift register 50. Each of the five serial shift registers has eight parallel outputs designated as $A_0$ through $A_7$. The series arrangement of the serial shift registers is achieved by interconnecting output $A_7$ of register 50 with the data input terminal of serial register 52. Similarly, output terminal $A_7$ of register 52 is connected to the data input terminal of register 54; output terminal $A_7$ of register 54 is connected to the data input terminal of register 56; and output terminal $A_7$ of register 56 is connected to the data input terminal of register 58.

Terminals $A_0$ through $A_7$ of each of registers 50, 52, 54, 56 and 58 are connected, respectively, to the input terminals of programmable read-only memories (PROM) 60, 62, 64, 66 and 68. Each of PROM's 60, 62, 64, 66 and 68 has four output terminals designated $O_0$ through $O_3$. Output terminals $O_{519}$ through $O_3$ of PROM's 60 and 62 are connected to the input terminals of a binary adder 70. Similarly, output terminals $O_0$ through $O_3$ of PROM's 64 and 66 are connected to the input terminals of a binary adder 72. Binary adders 70 and 72 each have a clock input terminal IN which is grounded and four output terminals designated $\Sigma_0$ through $\Sigma_3$. The outputs of binary adders 70 and 72 are connected to the corresponding eight input terminals of a third binary adder 74, which has its clock input terminal IN grounded.

The OT terminal of binary adder 70 is connected to a first input of an AND gate 76 and the first input of an Exclusive OR gate 78. The OT output terminal of binary adder 72 is connected to the second input of AND 76 and to the second input of Exclusive OR 78. The $\Sigma_0$ through $\Sigma_3$ output terminals of binary adder 74 are connected to the first four input terminals of a binary adder 80. Output terminals $O_0$ through $O_3$ of PROM 68 are connected to the remaining set of four input terminals of binary adder 80. Binary adder 80 has its clock input terminal connected to ground. The OT output terminal of a binary adder 80 is connected to the clock input terminal IN of binary adder 82. The $O_7$ terminal of adder 74 is connected to a first input terminal of binary adder 82. The next three input terminals of adder 82 are grounded. The output of Exclusive OR 78 is connected to a fifth input terminal of binary adder 82 and the output of AND 76 is connected to its sixth input terminal. The seventh and eighth input terminals of binary adder 82 are connected to ground. The four output terminals of binary adder 80 are designated signals $B_0$ through $B_3$ and only two output terminals of binary adder 82 are shown and are designated as signals $B_4$ and $B_5$. Signals B$\emptyset$ through B$_5$ are additionally designated as the correlator output signal.

Generally, the functioning of signal correlators is well understood in the art. An incoming signal is compared with a reference signal, usually by some type of comparator device, and the output is then provided to a summing circuit for the purpose of adding up the number of similar or dissimilar comparisons. As for example, U.S. Pat. No. 4,032,885 shows such a prior art digital correlator operating in the described manner. In the preferred embodiment for the present invention, it is advantageous to eliminate the separate comparator operation with the reference signal and allow the output of the serial bit registers into which the input data has been serially stored, to directly address a memory location in one of the several programmable read-only memories. The information at that location is the correct number of dissimilar comparisons.

Briefly, the operation of the correlator for the preferred embodiment is as follows. The data input signal is applied to the first register in the serial arrangement of the eight bit shift registers and, with each sampling clock signal, the measured signal level of the sample of the received signal is appropriately clocked into the first register. During start up of the system, the data will serially shift from left to right until all of the registers contain sampling information. At that time, there is a string of 40 bits in the several shift registers which preferably designate five samples each of eight bits of received input information. Thus, serial registers 50, 52, 54, 56 and 58 would accommodate an eight bit coded pattern and a sampling scheme of five samples for anticipated bit interval. It is clear to those skilled in the art that additional registers may be added to allow for an increased pattern for correlation or an increase in the number of samples per anticipated bit interval.

In the normal operation of a prior art correlator, the shift registers advance the sample values along and provide a storage means so that the data may be compared with the reference signal to provide the correlation. The reference signal and the input data signal are usually applied to a series of digital bit comparators so that when the sample and anticipated value correspond correctly, an output signal is produced. The output signals are then summed to determine how many correct comparisons there have been in the signal correlation.

For the first embodiment, it is advantageous to have the incoming sampled data directly address locations in a programmable read-only memory with the values of the information located at the addressable locations determining the correct number of correlations. This information is then supplied to adding circuits which then determine the correlation. Again, for the purposes of simplicity of the explanation, let the incoming digital signal pattern be a series of binary $\emptyset$'s and 1's and the pattern to which it is to be correlated an identical pattern of $\emptyset$'s and 1's repeated in a string at least as long as eight bits. Thus, serial registers 50, 52, 54, 56 and 58 would contain various sampled information corresponding to a $\emptyset$ and 1 bit string. In particular, serial register 50, when fully loaded, might contain, in the first five positions, five $\emptyset$'s followed by three $\emptyset$'s. Correspondingly, serial register 52 would contain two $\emptyset$'s and five 1's followed by an additional $\emptyset$. Then serial register 54 would contain four $\emptyset$'s and four 1's. Serial register 56 would contain one 1, five $\emptyset$'s and two 1's. Serial register 58 would then contain three 1's followed by five $\emptyset$'s.

Thus, the outputs A$\emptyset$ through A$_7$ of the various serial registers would correspond to the detected $\emptyset$-1 input signal pattern which had been sampled at the rate of five samples per anticipated bit interval.

The information in the programmable read-only memory may then be merely the sum of the correct number of $\emptyset$'s and 1's for the various serial positions within the serial register arranged at proper locations. It is clear that several different but possible patterns will address different locations all containing the same number. It is a matter of analysis of the number of permutations of N objects of which N$_1$ and N$_2$ are similar. In this case, the similarities are the numbers of 1's and $\emptyset$'s in the pattern. For example, consider the first five stages of serial register 50 and the corresponding outputs A$\emptyset$ through A$_4$. The various combinations for the pattern which may be derived from the output lines A$\emptyset$ through A$_4$ are as follows. First, there may be five 1's which is a unique configuration; secondly there may be four 1's and a $\emptyset$ for which there are five possible combinations; thirdly, there may be three 1's and two $\emptyset$'s for which there are ten possible combinations; fourthly, there may be two 1's and three $\emptyset$'s for which there are ten combinations; fifthly, there may be one 1 and four $\emptyset$'s for which there are five possible combinations; and, lastly, there may be all $\emptyset$'s which is also a unique configuration. There are then 32 possible combinations of the $\emptyset$ and 1 bit patterns for the first five bits of serial register 52, and each of these patterns comprises a different addressable location in PROM 60. However, the number of different values for the information stored at the location addressed by the input repetitive $\emptyset$-1 pattern is considerably less. Therefore, although the input signal pattern addresses many locations, the values of the number of correctly ascertained signal levels which would be stored at those locations is considerably less. Since the desired pattern for A$\emptyset$ through A$_4$ is all 1's, then counting the number of $\emptyset$'s present in the detected pattern gives a measure of the dissimilarity. This information may be additionally modified to achieve any functional weighting that might be appropriate.

Continuing with the analysis of the serial register 50, the remaining three bits could be treated as in a similar manner. Repeating the analysis for the three remaining bits, the all 1 configuration is unique, there may be one 1 and two $\emptyset$'s for which there are three possible combinations of this configuration, similarly two 1's and one $\emptyset$ provide three possible combinations and lastly, the all $\emptyset$'s provide a unique combination. This results in eight possible combinations. The size of the memory for the addressing operation is the product of the two possible combinations which is the 32 times eight possible combinations for the five and the three bit patterns which requires 256 addressable locations. It is therefore advantageous to have the memories contain at least 256 addressable locations and capable of containing four bits of information.

The analysis for the remaining registers is quite similar with the various combinations of the detected sample values causing addressing of a location at which is the correct value for the detected combinations of bits. The binary adders are preferably of the four bit type which are suitably interconnected to all of the output information from PROM's 60, 62, 64, 66 and 68. The arrangement is standard for four bit binary full adders with a fast carry operation. The arrangement allows the generation of a correlator output number having a maximum magnitude of 256 for counting dissimilarities. In the preferred embodiment, for eight bits sampled at five samples per anticipated bit interval, the worst case number is 40 but as will be described later in more detail, the correlation reference magnitude will eliminate the necessity of ever going to that value.

Moreover, it has been found to be advantageous to use standard integrated circuits to achieve the implementation of this correlator circuit. In particular, type SN74164 which are eight bit parallel output serial shift registers for which pin 1 would correspond to the input terminal, pin 8 would correspond to the clock terminal and pins 3, 4, 5, 6, 10, 11, 12, and 13 would correspond respectively to outputs designated $A_0$ through $A_7$. Similarly, it has been found to be advantageous to use a 1024 bit programmable read-only memory with three state outputs of the type SN74287 for PROM's 60, 62, 64, 66 and 68. In such cases, the inputs would be designated as pins 5, 6, 7, 4, 3, 2, 1 and 15; the data outputs would correspond to pins 12, 11, 10 and 9. In addition, it has been found advantageous for binary adders 70, 72, 74, 80 and 82 to employ type SN74283 which is a four bit binary full adder with fast carry. The input terminals of these adders correspond to pins 5, 3, 14 and 12 and 6, 2, 15 and 11. The output terminals designated $\Sigma_0$ through $\Sigma_3$ correspond to pins 4, 1, 13 and 10. The OT terminal corresponds to pin 7 and the IN terminal corresponds to pin 9, which in all cases except binary adder 82 is grounded. In the case of full adder 82 only output terminals designated $B_4$ and $B_5$ in the drawing are utilized and these correspond to pins 4 and 1. The IN terminal of adder 82 which is coupled to the OT terminal of adder 80 corresponds to the pin 9. The three data input terminals of adder 82 correspond respectively to pins 5, 6 and 2 with pins 3, 14, 12, 15 and 11 being grounded.

The arrangements of the four bit binary full adders with fast carry are such that the adding and carrying operation is totaled so that the correlator output designated as signals $B_0$ through $B_5$ corresponds to a number which represents in magnitude the degree of correlation between the incoming sampled signal and a predetermined signal pattern, which, for the purposes of description in this case, is a repetitive 0 and 1 binary sequence resulting from the application of a sample rate of five samples per anticipated bit interval.

While FIG. 3A shows the detailed circuitry corresponding to the correlation pattern matcher 32 of FIG. 2B, FIG. 3B shows the remaining detailed electronic schematic for the remainder of the system described by the functional block diagram of FIG. 2B. The output signals of the correlator, designated $B_0$ through $B_3$ are applied to the input terminals of a four bit magnitude comparator 90. The output signals from the correlator designated $B_4$ and $B_5$ are applied to the first two input terminals of a second four bit magnitude comparator 92. The remaining two input terminals of four bit magnitude comparator 92 are grounded. Binary signals designated $C_0$ through $C_3$ are applied to the second set of input terminals of magnitude comparator 90 and binary signals $C_4$ and $C_5$ are applied to the first two of the second set of input terminals of magnitude comparator 92. The remaining two of the second set of input terminals to magnitude comparator 92 are grounded.

The binary signal designated $C_0$ through $C_5$ is the reference magnitude signal which determines a range of magnitudes for which an acceptable correlation has been detected. In the example for which five samples per bit are used with an eight bit 01 repetitive signal for synchronization, the number of dissimilar comparisons between the bit samples and the corresponding anticipated bit pattern is preferably chosen to be less than or equal to four. Thus, as a specific example, $C_0$ through $C_5$ could be a binary encoded signal having magnitude four.

Magnitude comparators 90 and 92 are shown enclosed by a broken line to enhance their correspondence with comparator 36 of FIG. 2B. The inputs of magnitude comparator 90 designated symbolically as greater than, equal to or less than, are all connected to ground. The greater than, equal to or less than output terminals of magnitude comparator 90 are connected respectively to the greater than, equal to or less than input terminals of magnitude comparator 92. The less than and equal to output terminals of magnitude comparator 92 are connected respectively as the first and second inputs of an OR gate 93 whose output is connected as the first input of a NAND gate 94. The output of OR 93 is a signal designated as Detect Match. The second input of NAND 94 is a signal designated Enable Adjust which is similar to the enable adjust signal shown in FIG. 2B coming from a clock which is external to the timing functions of this portion of the system.

While many four bit magnitude comparators would be appropriate, it is convenient to utilize IC devices bearing the number SN74LS85 which are four bit magnitude comparators and when such a choice is made the input terminals at which signals $B_0$ through $B_3$ are applied, respectively, correspond to pins 10, 12, 13 and 15; while the input terminals at which signals $C_{519}$ through $C_3$ are applied correspond to pins 9, 11, 14 and 1. The input terminals less than, equal to and greater than correspond to pins 2, 3 and 4 while the output terminals less than, equal to, greater than correspond to pins 7, 6 and 5.

Similarly, for magnitude comparator 92, the input terminals at which signals $B_4$ and $B_5$ are applied, correspond to 10 and 12 with pins 13 and 15 grounded; the input terminals at which signals $C_4$ and $C_5$ are applied correspond to pins 9 and 11 with pins 14 and 1 grounded. The less than and equal to output terminals correspond to pins 7 and 6.

Referring again to FIG. 3B, the output of AND 94 is connected to the set terminal of D-type flip-flop 98. The D terminal of flip-flop 98 is connected to ground. The Q output of flip-flop 98 is connected as the first input of an OR gate 100. The output of OR 100 is connected to the clear terminal of a synchronous four but counter 102. A positive voltage is applied to the Enable P, Enable T and LD terminals of counter 102. The flip-flop 98 and counter 102 are shown enclosed in a broken line to enhance the correspondence with N-state counter 42 of FIG. 2B. The $Q_A$ terminal of counter 102 is connected to the first input $D_1$ of latch 103 and through an inverter 106 as a first input of a NAND gate 108. The $Q_B$ output of counter 102 is connected to the second input terminals $D_2$ of latch 103 and through an inverter 110 as the second input of AND 108. The $Q_C$ output terminal of counter 102 is connected to the third input terminal $D_3$ of latch 103 and through an inverter 112 as the third input of AND 108. The $Q_C$ output terminal of counter 102 is also connected as the second input of OR 100. The output terminals of latch 103 designated as $R_A$, $R_B$ and $R_C$ are connected respectively to the first three input terminals of PROM 104. The output of NAND 94 is connected through an inverter 105 to the enable input terminals of latch 103 designated as $E_1$ and $E_2$. The output of AND 108 is a signal designated Recovered Clock which corresponds to the bit edge and it is clear that NAND 94 corresponds to AND 38 of FIG. 2B.

The $B_0$ through $B_4$ output signals from the correlator are connected to the five remaining input terminals of PROM 104. For the preferred embodiment, the $B_5$ output signal is not used because of the range of possible comparisons for the five bit per sample operation and this results in the utilization of a smaller memory. However, by modifying the range of correlation magnitudes resulting from the arrangement of the eight bit serial shift registers the resulting additional information can be used to address a larger memory.

PROM 104 may be a 256 by eight bit addressable memory. Typically, such a memory could be comprised by an IC designated MCM7641 which is a 512 by eight bit-three stage output programmable read-only memory. It will be recalled that by the example for the five sample per bit and eight bits contained in the serial registers that a 256 by four bit memory would be appropriate. In this case, the MCM7641 provides additional information capacity which, for the normal operation under the conditions described, may not be completely utilized. However, the addressing features are completely utilized.

The output signals of counter 102 form a portion of the possible addresses of PROM 104 while the signals from the correlator output designated $B_0$ through $B_4$ complete the specification of an address within PROM 104. Latch 103 ensures that the information in counter 102 is retained for the purpose of addressing PROM 104. For latch 103 with both enable inputs $E_1$ and $E_2$ at $\emptyset$, the output levels will follow the data input levels. When both enable input levels are at 1 the output levels $R_A$, $R_B$ and $R_C$ remain at the last levels established at inputs $D_1$, $D_2$ and $D_3$, respectively, prior to the $\emptyset$ to 1 level transition at the enable inputs. Thus the output of NAND 94 causes latching. The contents at the specific locations of PROM 104 provide for the application of the functionally related adjustment signal to achieve synchronization. It is clear that with two independent variables, in particular the time variable as designated by the output of counter 102 through latch 103 and the magnitude of dissimilarity variable, as designated by signals $B_{519}$ through $B_4$, the PROM 104 can be programmed to apply whatever function relationship is desired for the correction magnitude and direction appropriate for the input conditions of time and magnitude of dissimilarity.

The first four output terminals of PROM 104 designated $M_0$ through $M_3$ are applied to the input terminals of synchronous counter 114 and the remaining four output terminals designated $M_4$ through $M_7$ of PROM 104 are connected to the input terminals of synchronous counter 116. The output of AND 94 is connected to the load terminal of each synchronous counters 114 and 116. Positive voltage V is applied to the Enable T and Enable P terminals of synchronous counter 114. The carry output terminal designated TC of counter 114 is connected to the Enable T, Enable P terminals of counter 116. A fast clock 117 operating at at least 32 times the sampling clock rate is applied to the clock input terminals of both counters 114 and 116. The fast clock may be derived from the same enable adjust source which provides the enabling signal to AND 94. It is well known in the art to include various clock timing means to cause counting and dividing of signals in an appropriate manner. Counters 114 and 116 are shown enclosed in a broken line to enhance the correspondence with the variable phase clock 40 of FIG. 2B. The latching feature is provided by the counters in conjunction with the logic gates appropriately attached thereto.

Output terminals $F_1$, $F_2$, $F_3$ and $F_4$ of synchronous counter 114 are connected respectively as the first, second, third and fourth input terminals of NAND 118 and OR 120. Output terminal $F_5$ of synchronous counter 116 is connected as a fifth input of NAND 118 and a fifth of OR 120. Output terminal $F_6$ is connected as the sixth input of OR 120 and through inverter 122 as the sixth input of NAND 118. Output terminal $F_7$ is connected as the seventh of OR 120 and through inverter 124 as the seventh input of NAND 118. Output terminal $F_8$ is connected as the eighth input of OR 120 and through inverter 126 as the eighth input of NAND 118. The output of NAND 118 is connected to the Clear terminals of both synchronous counters 114 and 116. The output of OR 120 is connected to the clock terminal of synchronous counter 102 and to the clock terminal of data flip-flop 98. The signal at the output of OR 120 is designated as the Sampling Clock Signal.

The function of synchronous counters 114 and 116 may be described as follows. Fast clock 117 operates at a rate that is 32 times the normal sampling rate for the system. As had been described earlier, it is preferred to describe the system in terms of a five sample per bit rate but the actual frequency of operation being determined by the bit rate at which information is received. Synchronous counters 114 and 116 combine to form a counting unit which is capable of a maximum of 256 states. Counter 114 by itself can count up to 16 states normally designated as $\emptyset$ through 15 and the carry over is accomplished by counter 116 which also has 16 possible states giving the total combination of 256. In operation, fast clock 117 generates the timing signals to cause counting to occur. It may be seen from the interconnection of the logic devices with counters 114 and 116 that the clear terminal is activated on the 31 to $\emptyset$ state transition. For the adjustment of time, the outputs of PROM 104 are applied to the synchronous counters 114 and 116 and cause various states to be preset. For example, if one wished to count only 24 states, one could put in 256 minus 24 as the preset state and this would allow for counting 24 states and achieving the $\emptyset$ state transition in 24 fast clock time periods. At the transition of 255 to $\emptyset$ state the sampling clock signal is produced. This clock signal is 1/32 of a sample time interval but the circuit responds to the leading edge of the pulse. Clearly, adjustments for both advancement and retardation of the normal timing signal may be achieved by inputting different preset stages and causing different counting times to occur from the designated input state to the transitional $\emptyset$ state to produce the Sampling Clock Signal.

The information contained in PROM 104 is the predetermined information of the desired functional relationship for the combustion of the independent variables of time and magnitude of dissimilarity. For example, if a variation which is only a function of time were desired, all of the input information contained in PROM 104 would have the values independent of the error magnitude or if the correction to be applied were only a function of the magnitude of the detected dissimilarity, that information would be contained at the various locations of PROM 104. The choice of the specific information contained in PROM 104 is not relevant except to the fact that it is the combination of the independent variables of both time and magnitude and dissimilarity which acess the magnitude of an adjustment value.

While any of a number of counters might be used for synchronous counters 102, 114 and 116 it is advantageous to use the type designated SN54LS163. With that designation, the input terminals correspond to pins 3, 4, 5 and 6, the LD terminal corresponds to pin 9, the Enable T, Enable P correspond to pins 10 and 7, the clear terminal corresponds to pin 1, the clock terminal corresponds to pin 2, the TC or ripple carry terminal corresponds to pin 15, the $F_1$ through $F_4$ output terminals correspond to pins 14, 13, 12 and 11. The same correspondence holds for synchronous counter 116. For the counter 102 the input terminals are not utilized and only three of the output pins are required. Output terminals $Q_A$, $Q_B$, $Q_C$ correspond respectively to pins 14, 13 and 12. Preferably data flip-flop 98 is of an SN54LS74 type for which the D, CK, Q and S terminals correspond to pins 2, 3, 5 and 4 respectively. Any of several latching device may be employed but it is convenient to utilize an SN74116 for which the $D_1$, $D_2$, $D_3$, $R_A$, $R_B$, $R_C$, $E_1$ and $E_2$ terminals correspond respectively to pins 4, 6, 8, 5, 7, 9, 2 and 3.

The operation of the correlator circuit shown in FIG. 3A has been previously described as producing a signal indicating the magnitude of dissimilarity between the input detected signal and a predetermined signal. In the operation of the detailed circuitry shown in FIG. 3B, the correlator output signal is compared with a predetermined reference magnitude which sets an acceptable limit for correlation. When an acceptable limit has been detected, the detect match signal is actuated indicating that match in the binary sequences has been detected. At an appropriate time for the system as designated by an enable adjust signal from the external clock, the set terminal of data flip-flop 98 is actuated to clear counter 102. In response to the sampling clock signal, counter 102 cycles through its five possible states, each one being indicative of a serialization of the sample time within an anticipated bit interval. The sampling clock signal, it will be recalled, causes reception of an additional sample from the incoming signal circuit. The output signals of counter 102 are combined with the correlator output signal to address PROM 104 to provide the predetermined corrections.

Synchronous counters 114 and 116 provide counting at a rate that is 32 times the normal sample rate and respond to the inputs from PROM 104 to preset the time position at which ∅ state is reached. It is the variance in the normal 32 state time interval between the clear and the achieving of the ∅ state which determines the relative time position for the sampling clock signals. The effect of the output of PROM 104 is to selectively increase or decrease the time at which a sampling clock signal is produced. Thus, the synchronization which occurs is in the timing of the sampling clock signal and that its advancement or regression is determined both by the serial sampling period within an anticipated bit interval during which a magnitude of correlation is detected.

While many variable phase clock adjustment schemes are possible, the preferred embodiment employs a scheme in which an adjustment is always made to the variable phase clock when the correlation error magnitude is less than the maximum allowable magnitude. Correction of the clock phase is made so that the new phase is adjusted with respect to the detect match signal and not the old phase interval (see Table I). As an example of the type of information which may be stored in PROM 104 reference should be made to Table I which may be used to create a related table.

TABLE I

| | DECIMAL EQUIVALENT OF PERCENT OF BIT INTERVAL | ERROR MAGNITUDE | | | | |
|---|---|---|---|---|---|---|
| | | 0 | 1 | 2 | 3 | 4 |
| SAMPLE NO. | 0 | .60 | .53 | .47 | .41 | .35 |
| | 1 | .60 | .58 | .57 | .56 | .55 |
| | 2 | .60 | .60 | .60 | .60 | .60 |
| | 3 | .60 | .61 | .62 | .63 | .64 |
| | 4 | .60 | .66 | .72 | .78 | .84 |

The normal signal to the variable phase clock is one which will identify the position of the center of the next bit interval. For the decision made in the last sample period of the previous bit interval the correct adjustment is 0.60 or 60% of an anticipated bit interval. Table I shows the corresponding values for the situation in which there are 5 sample periods per bit interval and the maximum allowable magnitude for a correlation error is 4.

FIG. 4 shows a detailed functional block diagram for an alternative form of correlator 32 which is a modification of the correlator shown in FIG. 3A. An advantage of the signal correlator constructed in accordance with FIG. 4 is that it has both hardware and firmware implementations and serves as an introduction to the description of an alternative embodiment for the synchronization system. The functions of the correlators of FIG. 3B and FIG. 4 are identical and the only variations occur in the detailed data processing path. Both devices take the stream of incoming data and perform the correlation function with the use of a sampling clock signal. Both devices produce equivalent correlation output signals. The correlator of FIG. 4 may even be interconnected with the rest of the hardware embodiment as shown in FIG. 3B. The principal difference between the devices is that correlator of FIG. 4 utilizes greater sophisitication in the signal analysis and has several data processing advantages including a firmware implementation as will be described.

The schematic diagram of FIG. 4 shows a signal input line applied to the input terminals of five serial shift registers designated 150, 152, 154, 156 and 158. Each of these serial shift registers has a selective enable terminal designated SE and a clock terminal designated CK. The input terminals of the serial shift registers are labelled IN and the output terminals are labelled OT. Each of the OT output terminals represents eight lines of output as shown by the label 8/ on each line. The information transmitted on each of the individual lines corresponds to one of the eight bits contained in the serial shift register.

Each of the OT output terminals of registers 150, 152, 154, 156 and 158 is connected to a corresponding input terminal of a multiplexer 160. It may be appreciated that each of these input terminals really represents eight lines of input and the total number of input terminals would be forty. The function of the multiplexer is to select which of the five possible combinations of eight lines will be activated.

A clock circuit 162 operating at a rate of twenty-five times the bit rate supplies its signal to a divide-by-five counter 164. A first output of divide-by-five counter 164 is supplied to the clock terminals of each of serial shift registers 150, 152, 154, 156 and 158. The output of divide-by-five counter is also supplied to a five-stage counter 166 whose binary encoded output is supplied to a demultiplexer 168 and to the select terminal of multiplexer 160. Demultiplexer 168 has five outputs designated as signals 0, 1, 2, 3 and 4 and these correspond to the selective enable terminals of the serial shift registers and the connection to the Select terminal of multiplexer 160 ensures actuation of the corresponding regions for the input terminals.

Multiplexer 160 functions to selectively apply eight bits of information contained in a selected one of the serial shift registers. The multiplexer operates by decoding the binary encoded signal it receives from five-state counter 166. The output of multiplexer 160 is connected to a PROM 170 containing a correlation error table. The output of multiplexer 160 is shown as a single line bearing the label 8/ indicating that eight parallel outputs are used to connect with the PROM. The eight signals from multiplexer 160, which correspond to the bit sequence in one of the selected serial shift registers, are used to address locations in PROM 170. The purpose of this feature will be described in more detail later as this operation corresponds to a finite impulse response correction procedure for a digital filter.

The output from PROM 170 is applied to the input terminals of five buffer registers designated 172, 174, 176, 178 and 180. Each of these buffer registers contains a select input terminal and input terminals to which the output of PROM 170 are connected in parallel. The input terminals for buffer registers 172, 174, 176, 178, 180 are selectively enabled by the signals from the multiplexer 168 designated 0 through 4, respectively. The buffer registers function as parallel eight-bit in, eight-bit out selectively enabled registers. The outputs of buffer registers 172, 174, 176, 178 and 180 are connected respectively to the input terminals of a multiplexer 182 which are labelled respectively as 0', 1', 2', 3' and 4'. A second output of divide-by-five counter 164 is connected to a demultiplexer 184 having five output terminals labelled 0', 1', 2', 3' and 4', each of which is connected to the multiplexer 182. Demultiplexer 184 provides an individual signal at five times the selective enable rate to access the buffer registers. Demultiplexer 184 then selectively transfers information from the buffer registers to the output terminal. Thus during each selective enable signal corresponding to a sampling interval, the information in all five buffer registers is transferred through a multiplexer 182.

The output terminals of multiplexer 182, shown as a single line, are connected to a summation register 186 which is in turn connected to an accumulation register or accumulator 188. The output of accumulator 188 is connected back to summation register 186 and also to the input of an output register 190. Output register 190 is selectively enabled by an output signal from divide-by-five counter 164. Accumulator 188 also receives signals for clearing and accumulating designated CLR and ACC. It may be appreciated that these signals may be generated as part of an external timing circuit for the system and function to cause accumulation of the information transferred to the summation register or clearing the accumulator for the next accumulation of information. The signals for clear and accumulate correspond to the functional operation for adding all of the contents of the five buffer registers after each selective enabling by demultiplexer 168. Thus, each time the information could be changed in any one of buffer registers 172–180, the sum of all five registers is accumulated in accumulator 188 and placed in output register 190, which at an appropriate time provides the correlator output. Then with the next selective enabling the accumulator is cleared to allow an additional summing of the contents of five buffer registers.

The functional description of this circuit begins with clock 162 operating at a rate which is twenty-five times the bit rate. Divide-by-five counter 166 reduces a clocking signal to the five-times bit rate which is precisely the sampling rate described earlier. Thus the output of divide-by-five counter 166 provides the clocking signal for the incoming signal information to be serially shifted into the selectively enabled shift register. It may be observed that operating at the same rate is five-state counter 166 which functions through demultiplexer 168 to selectively enable the serial shift regsiters. Thus the first sample of information on the signal in line would go into register 150, the next sample would go into register 152, then each succeeding sample would serially be advanced into the next appropriate register. Upon completion of five sample cycles, the next sample would again be applied to the input terminal fo serial shift register 150 and appropriately clocked in. Thus the information in each of the serial shift registers is one sample of eight possible bits of information and that the information in the various serial shift registers is serially related in time. Register 150 contains all sampled data at the ∅ sampling as designated by the ∅ state of five-state counter 166 and the ∅ enabling signal from demultiplexer 168. Registers 152, 154, 156 and 158 contain all the sampled data at the 1, 2, 3, 4 selective enable signals respectively.

During the selective enabling of multiplexer 160, the information contained in the several serial shift registers is used to address PROM 170 containing a correlation table of errors for the correlator operation. The binary encoding contained in the eight positions of each of the serial bit registers addresses PROM 170 which contains predetermined information based on a design of a finite impulse response (FIR) filter. Reference should be made to Table II.

TABLE II

| | | | | | | | | | | | | | | | | |
|---|---|---|---|---|---|---|---|---|---|---|---|---|---|---|---|---|
| 00 | 01 | 01 | 01 | 02 | 01 | 01 | 03 | 02 | 01 | 04 | 06 | 05 | 03 | 02 | 05 | 01 |
| 10 | 01 | 02 | 04 | 02 | 02 | 01 | 02 | 01 | 04 | 02 | 05 | 01 | 02 | 01 | 01 | 01 |
| 20 | 02 | 02 | 02 | 03 | 02 | 03 | 04 | 03 | 02 | 05 | 07 | 06 | 04 | 03 | 06 | 02 |
| 30 | 02 | 03 | 05 | 03 | 03 | 02 | 03 | 02 | 05 | 03 | 06 | 02 | 03 | 02 | 02 | 02 |
| 40 | 01 | 00 | 01 | 01 | 01 | 00 | 02 | 01 | 00 | 03 | 05 | 04 | 02 | 01 | 04 | 00 |
| 50 | 01 | 00 | 03 | 01 | 00 | 00 | 01 | 00 | 03 | 01 | 04 | 03 | 01 | 00 | 03 | 01 |
| 60 | 01 | 01 | 01 | 02 | 01 | 02 | 03 | 02 | 01 | 04 | 06 | 05 | 03 | 02 | 05 | 01 |
| 70 | 01 | 02 | 04 | 02 | 02 | 01 | 02 | 01 | 04 | 02 | 05 | 01 | 02 | 01 | 01 | 01 |
| 80 | 02 | 02 | 02 | 03 | 02 | 03 | 04 | 03 | 02 | 05 | 07 | 06 | 04 | 03 | 06 | 02 |
| 90 | 02 | 03 | 05 | 03 | 03 | 02 | 03 | 02 | 05 | 03 | 06 | 02 | 03 | 02 | 02 | 02 |
| A0 | 03 | 03 | 03 | 04 | 03 | 04 | 05 | 04 | 03 | 06 | 08 | 07 | 05 | 04 | 07 | 03 |
| B0 | 03 | 04 | 06 | 04 | 04 | 03 | 04 | 03 | 06 | 04 | 07 | 03 | 04 | 03 | 03 | 03 |
| C0 | 01 | 01 | 01 | 02 | 01 | 02 | 03 | 02 | 01 | 04 | 06 | 05 | 03 | 02 | 05 | 01 |
| D0 | 01 | 02 | 04 | 02 | 02 | 01 | 02 | 01 | 04 | 02 | 05 | 01 | 02 | 01 | 01 | 01 |

TABLE II-continued

| | | | | | | | | | | | | | | | | |
|---|---|---|---|---|---|---|---|---|---|---|---|---|---|---|---|---|
| E0 | 02 | 02 | 02 | 03 | 02 | 03 | 04 | 03 | 02 | 05 | 07 | 06 | 04 | 03 | 06 | 02 |
| F0 | 02 | 03 | 05 | 03 | 03 | 02 | 03 | 02 | 05 | 03 | 06 | 02 | 03 | 02 | 02 | 02 |

It is well known in the prior art how a finite duration impulse response filter operates and an array of coefficients in the correlation error table corresponds generally to the constants in a series expansion of a functional relationship for the chosen filter design. The purpose of the correlation is to locate the edges in the bit synchronization field of the decoder data stream. This technique is more flexible than the standard binary correlation technique. It may be appreciated that any of several possible designs may be employed and that the information contained in the correlation table would be a matter of choice.

As described earlier Table II shows the array of coefficients for the finite impulse response filter operation. It may be appreciated that the first column of Table II corresponds to the hexidecimal representation of the binary bit pattern which can occur in any of the serial shift registers 150–158. It may be appreciated that there are $2^8$ or 256 possible combinations of these bit patterns and thus there are 256 entries in this table. Shown in a 16×16 array fashion are the correction constants corresponding to the known method of a finite impulse response filter. When these constants are accessed by the serial bit pattern contained within the serial shift register, or the equivalent data register of the firmware program, the information is transferred into the buffer registers for subsequent summation to determine the corresponding error magnitude. With this information, the weighting of the correlation operation for the determining signal correlation can be duplicated.

Each time demultiplexer 168, in conjunction with five-state counter 166 caused the selective enablement and clocking of a serial shift register and the transfer of information to address PROM 170, information stored at the address location is transferred to an output buffer register capable of containing eight bits of information. Thus during each sample time, one of the buffer registers is loaded with the information contained in the correlation error table. After each such correlation error is loaded into one of the buffer registers, all five buffer registers are interrogated with the sum of the error magnitudes sent to an accumulator to produce an output correlator signal for each sample period.

Buffer registers 172 through 180 are selectively enabled in the same time sequence as the selective enabling of the serial shift registers 150. Thus the information contained in the correlation error table is transferred in and stored during each sample time in an appropriate buffer register. Demultiplexer 184 operates at five times the rate of demultiplexer 168 and transfers the information contained in the five buffer registers to summation register 186 and then into accumulator 188 so that the sum of all the information in the buffer registers 172–180 may be accumulated for each selective enabling which occurs during sampling each of the five times the bit rate time. Thus for each sample, multiplexer 182 transfers information from each of buffer registers 172–180 into summation register 186 where it is summed and this information is accumulated in accumulator 188 so that, for each sampling time, the sum of all the errors in the buffer registers 172–180 are transferred into outout register 190 to provide the correlator output signal. Thus the detailed comparison of the comparators of FIGS. 3A and 4 show that the designation data in is the equivalent of signal in; the sampling clock signal is the equivalent of the signal output from the clock bit rate X 25 block 162; and the output signals are equivalent. Moreover, while registers 50 to 58 in FIG. 3A are arranged in a serial configuration while registers 150 to 158 in FIG. 4 are in a parallel configuration to enhance the multiple sampling per bit operation. The inclusion of the various multiplexers and demultiplexers of FIG. 4 serve to provide the correct data sequence for analysis while the same operation is provided in FIG. 3A by the hardwire interconnection of the adders. The device of FIG. 4 does utilize a FIR filter technique which improves the sophistication of the analysis.

Figure 5:
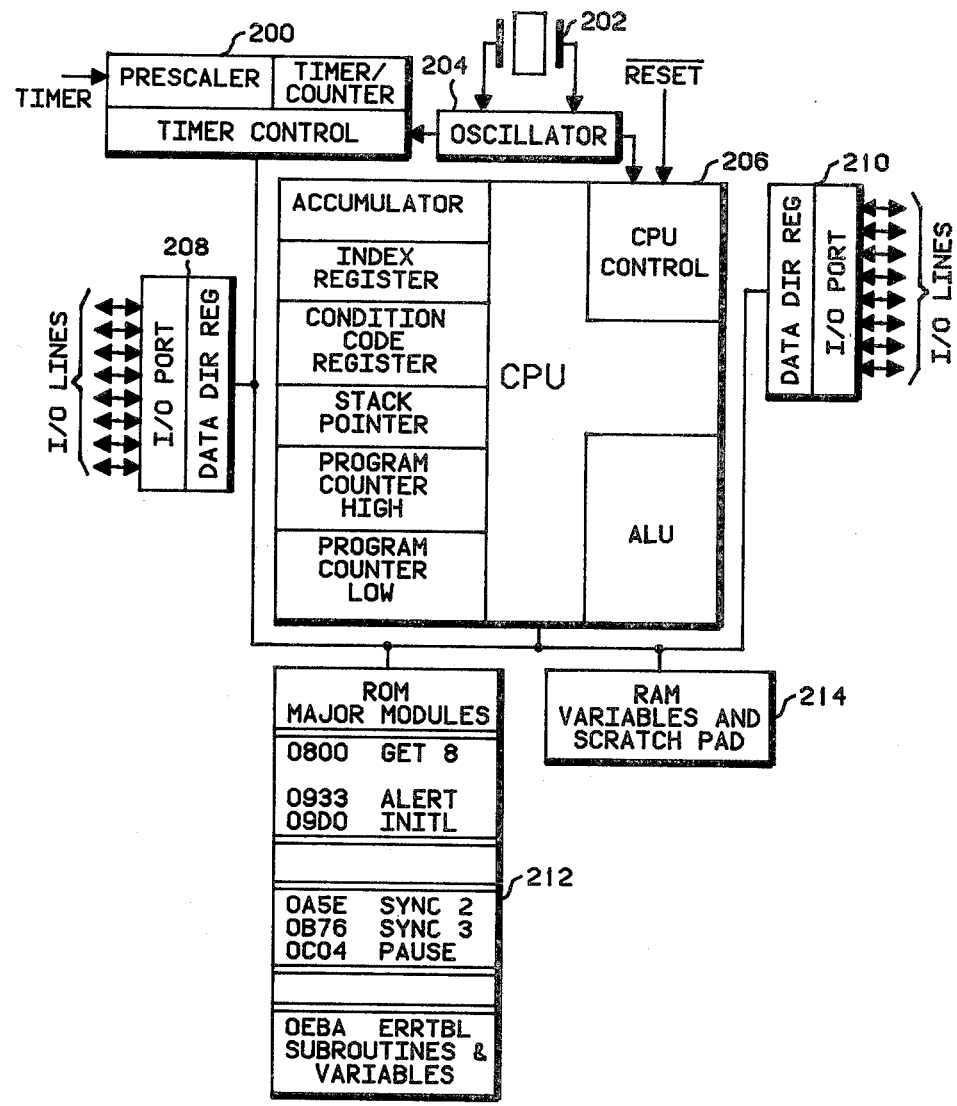
FIG. 5 is a block diagram of a microcomputer containing the firmware program for an alternative embodiment of the invention.

FIG. 5 shows a combination functional and schematic block diagram of a microcomputer of the type suitable for containing a firmware implementation of the functional block diagram of the complete synchronization system shown in FIG. 2A and which contains a signal correlator of the type shown in FIG. 4. Although this alternative embodiment should not be so limited, it is preferred that the microcomputer be of the Motorola 146805 type. A timer signal for actuation is supplied to a timer control unit 200 containing a prescaler and a timer and counter. A crystal 202 is coupled to oscillator circuit 204 which is also connected to timer control 200. The timer control circuit controls the various operations of the microcomputer.

Oscillator 204 is also connected to central processing unit 206 which contains the central processing unit control circuit, an arithmetic logic unit designated ALU, an accumulator, index register, condition code register, stack pointer, program counter high and program counter low modules. Also connected to the central processing unit are data directional input/output registers 208 and 210 having a plurality of input/output lines. In particular, eight lines are shown for each of two data direction registers. Also interfacing with the central processing unit are a read-only memory (ROM) 212, and a random access memory (RAM) 214. As is characteristic of the Motorola 146805 family the on-chip RAM permits the microcomputer to operate without an external memory. The parallel input/output capability includes programmable pins indicating whether it is to be an input or an output. The timer/counter is normally an eight-bit counter with a programmable prescaler which can be used as an event counter to generate interrupt signals at certain software-selected events or can be used for timing keeping. In the case of the Motorola CMOS version MCM146805, this timer can be set to wake-up the microprocessor from a software-actuated command to establish a power-saving wait mode.

FIG. 5 also shows the arrangement of major firmware modules stored in the ROM and the corresponding addresses at which the modules begin. The choice and arrangement of this module is a function of the specific program for the alternative embodiment of the present invention. It is sufficient to describe the major program modules and their address origination points so that with the core dump of the operating software program for the alternative embodiment, one can ascertain where the various subroutines begin. The use of RAM 214 is principally to contain variables accessed during the program and as a scratch-pad storage. The use of the Motorola 146805 is not a necessary requirement for the alternative embodiment, however, it is a convenient one. All of the subsequently disclosed coding are written to be compatible with the 146805 coding format.

The 146805 microprocessor and its associated architecture and internal instruction set have been described in detail in the following filed U.S. patent applications: U.S. Ser. No. 054,093, filed July 2, 1979, entitled "Low Current Input Buffers"; U.S. Ser. No. 065,292, filed Aug. 9, 1979, entitled "Method for Reducing Power Consumed by a Static Microprocessor"; U.S. Ser. No. 065,293, filed Aug. 9, 1979, entitled "Apparatus for Reducing Power Consumed by a Static Microprocessor"; U.S. Ser. No. 065,294, filed Aug. 9, 1979, entitled "CMOS Microprocessor Architecture"; U.S. Ser. No. 065,295, filed Aug. 9, 1979, entitled "Incrementor/Decrementor Circuit"; and U.S. Ser. No. 079,766, filed Sept. 28, 1979, entitled "A Single Step System for a Microcomputer", all of the above six applications being commonly assigned to the assignee of the present invention. The six designated applications are hereby incorporated by reference for a more complete description of the MCM146805 microcomputer.

The alternative embodiment provides a bit-synchronization system for a communications receiver system, and it is therefore necessary to understand the coding format under which the communications receiver system operates. It will be appreciated that, because the signal coding and decoding scheme is relatively complex but the synchronization scheme is somewhat more simple, the synchronization operation will of necessity be contained within a reasonably lengthy firmware program. However, when synchronization is desired, that portion of the firmware containing the synchronization routine is addressed so that synchronization can be achieved according to the functional block diagram. In particular, the functional block diagram shown in FIG. 4 is the principle diagram for the signal correlator portion of the operation of the alternative firmware embodiment while the overall operation is shown in FIG. 2B.

FIG. 6 shows a diagram of the repetitive message coding scheme which would require synchronization of the type provided by the present invention to describe the alternative embodiment of the present invention. This signalling system is similar to one described in the article entitled "New Radio Paging System" described in the March, 1978, *Telocator*, a trade journal for paging systems, beginning at page 26. This system uses NRZ (non-return-to-zero) digital signal coding, instead of the selective calling signal of two sequential tones used by several conventional systems. The coded signal accesses individual paging devices to generate an alert signal that a message has been received for the person carrying the device. The system is a synchronous one in that each receiver synchronizes to a signal designated at the transmitter.

As shown in line A of FIG. 6, the signals to all receivers are divided into fifteen groups. Selective calling signals for a receiver within a group are sent only for the corresponding time duration of the individual group signal. Line B shows that the group call signal consists of nine words. The first word is a synchronization word and the remaining eight words are information words. A synchronization signal and up to eight selective calling signals are sent for each group. Line C of FIG. 6 shows the detailed arrangement of the synchronization word for any group. A thirty-one bit synchronizing word comprises a nine-bit synchronizing signal, a fifteen-bit frame synchronizing signal, and a seven-bit group identification signal. As may be seen in line C, the bit-synchronization word is designated as nine bits $K_1$ through $K_9$, frame synchronization as $L_1$ through $L_{15}$ and the group designation $G_1$ through $G_7$. The nine-bit synchronizing signal is used to synchronize the internal clock of each receiver to that of the received signal so that proper decoding may be achieved. Thus the desired synchronization which is achieved is between the local clock of the receiver and the broadcast clock of the transmitter.

The frame synchronization signal uses a fifteen-bit code to indicate the position of selective calling signals. The group indicating signal uses a seven-bit code to identify the group. This signal comprises four information bits and three check bits in a BCH format. Line D of FIG. 6 shows the construction of an information word containing thirty-one bits. Each information word comprises a thirty-one BCH code composed of sixteen bits for information and fifteen bits for checking. As shown in line D, the information bits are labelled $I_{16}$ through $I_1$ and the parity bits are labelled $P_{15}$ through $P_1$.

It may be appreciated that a variety of formats of information may be used for the bit-synchronization portion of the coding as indicated in line C of FIG. 6. The nine bits of information which are used to achieve bit-synchronization can be any of a number of patterns. However, for the purposes of explanation, the most commonly occurring pattern is a repetitive $0$ and 1 sequence for the nine bit positions. The firmware description of the alternative embodiment will proceed under the assumption that the signalling system is a nine-bit $0$ and 1 repetitive bit-synchronization pattern.

Figure 7A:
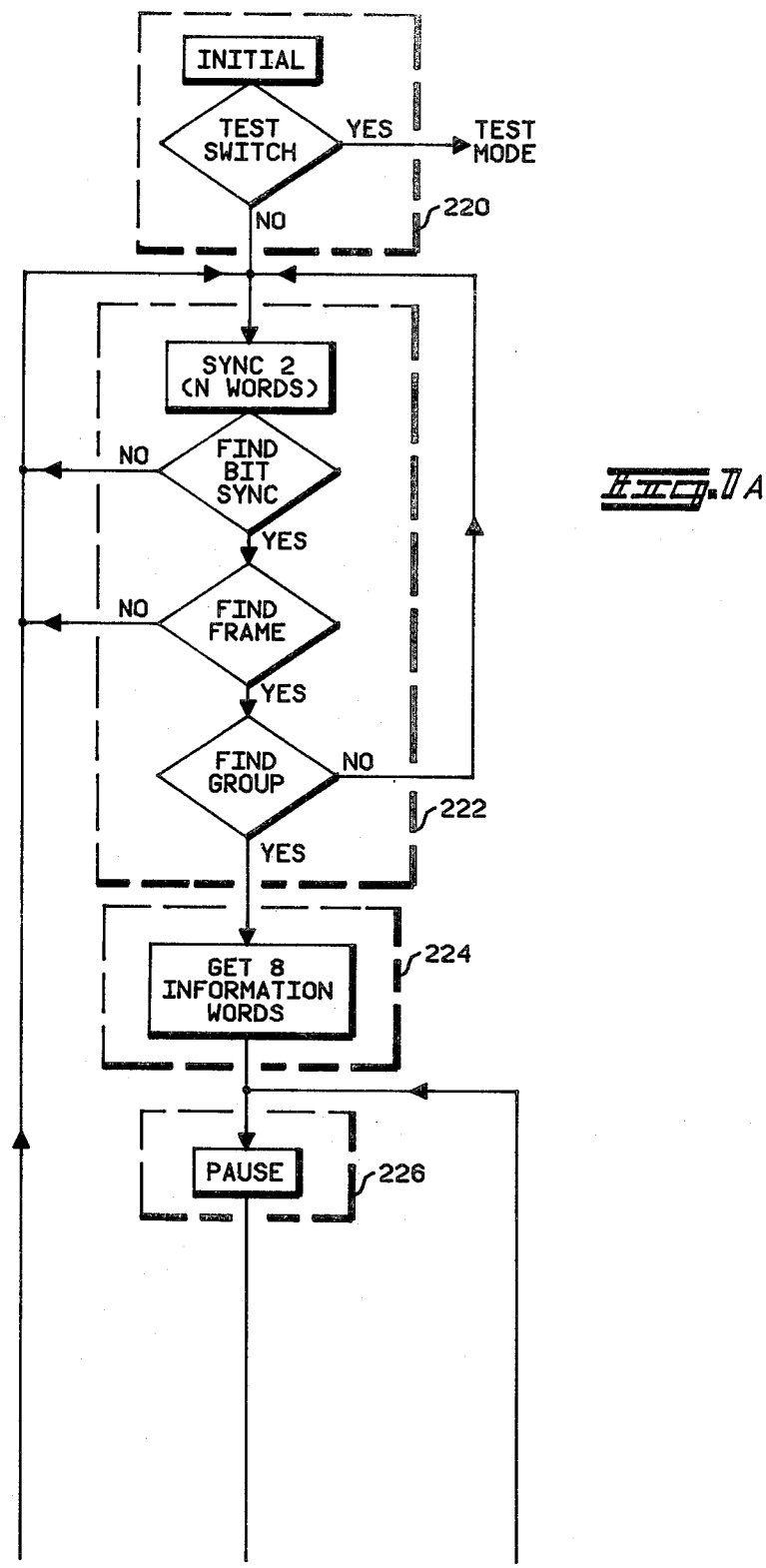

FIGS. 7A and B show a flowchart of the operational program to decode a communication coding system shown in FIG. 6 which requires synchronization of the type provided by the present invention. A program module INITIAL enclosed with a broken line and designated 220 includes a decision block interrogating a test switch normally not accessible to the user. The setting of the test switch results in a test mode which is not necessary to the description of the synchronization system. During actuation of INITIAL module 220, the code plug information designating as many as two addresses, is transferred into specified memory locations. The inclusion of two addresses allows the receiver to receive and distinguish between calls from two different sources, such as, for example, between urgent calls and nonurgent calls.

If the test switch has not been set, a program module SYNC 2 enclosed by a broken line and designated 222 operates for a period of N words to find bit synchronization, frame positions and group identification. N may be chosen with respect to the message scheme code shown in FIG. 6 to find and identify frame positions (word delineators) and group positions (nine word delineators) with some desired confidence level. Any negative answer from the decision blocks of module 222 causes a return to the entry point of SYNC 2 module 222.

The affirmative FIND GROUP line from SYNC 2 module 226 accesses a GET INFORMATION WORDS module 224 which operates to interrogate the memory locations where the one or more code plug address information has been stored. It interrogates eight information words contained in each group segment to determine if a page has been detected. Any decision as to whether a page has been detected is deferred until the eight information words within a group have been reviewed.

GET 8 INFORMATION WORDS module 224 accesses a pause module 226. PAUSE denotes a suspension of decoding and processing incoming signals for some timed period. Thus, the first time there is an attempt to detect a page and before any detect can be confirmed, the system assumes a PAUSE configuration for one complete message cycle and returns at the same relative position in the approximately 21 second message cycle.

After the PAUSE operation, control is transferred to a SYNC 3 program module enclosed by a broken line and designated 230. SYNC 3 is the signal synchronization portion for the alternative embodiment. SYNC 3 interrogates one word of information comprising eight bits of the synchronization word and determines if this corresponds to the predesignated repetitive $\emptyset 1$ pattern. The data is listed to determine if it is still valid and currently in synchronization. DATA STILL VALID is a procedural test to insure that long term integrity of the data has been maintained to some desired confidence level. A negative determination transfers control back to the entry point of SYNC 2 module 222. IN SYNC NOW is a procedural test to check the positions of selected fields in the data system. A negative determination transfers control back to PAUSE module 226.

A positive determination accesses an ALERT module 230 enclosed by a broken line which functions to cause an audible alert signal to alert the pager carrier if one of the eight information words corresponded to an address in the code plug. It may be appreciated that since there are two types of addresses, this device may have two kinds of tones for the ALERT signal which may be used to discriminate between which of the two addresses, has been paged. If the ALERT signal is not manually reset by the carrier of the paging device, it will remain on for several minutes and then shut off. A manual reset button available to the paging device carrier allows for shutting down the ALERT signal indicating acknowledgement.

After the manual resetting of the ALERT signal, or if no page is detected control of the program is transferred to PAUSE module 226 as before. After the suitable time period, the PAUSE module 226 transfers control to SYNC 3 module 232 which looks for synchronization of the eight bits in the synchronization word and whether the data is still valid. The inclusion of SYNC 3 at this point in the flowchart is to confirm that the paging device has remained in synchronization after the pause operation. A negative determination from DATA STILL VALID causes transfer to the entry point of SYNC 2 module 222 in FIG. 7A. Because of the possibility of a second address or a second call corresponding to the second address of the pager, the output of the SYNC 3 module 232 transfers control to module 234 which comprises GET 8 INFORMATION WORDS and DETECT PAGE modules. The GET 8 portion functions to again interrogate the eight bit address word and to determine if a second addressable code has been detected. In the event that a page has not been detected, control is then returned to PAUSE module 226 configuration. If a second addressed page ID code has been detected, control of the program is transferred to ALERT module 230 to signal the pager carrier.

The operational loop for the system once an alert signal has been detected is through PAUSE module 226 of FIG. 7B into SYNC 3 module 232 of FIG. 7B and module 234 of FIG. 7B. It is this looping where the normal operation of the pager occurs. The SYNC 3 module 232 ensures the synchronization of the internal clock with the incoming signal information contained in the synchronization word for each group.

Figure 8:
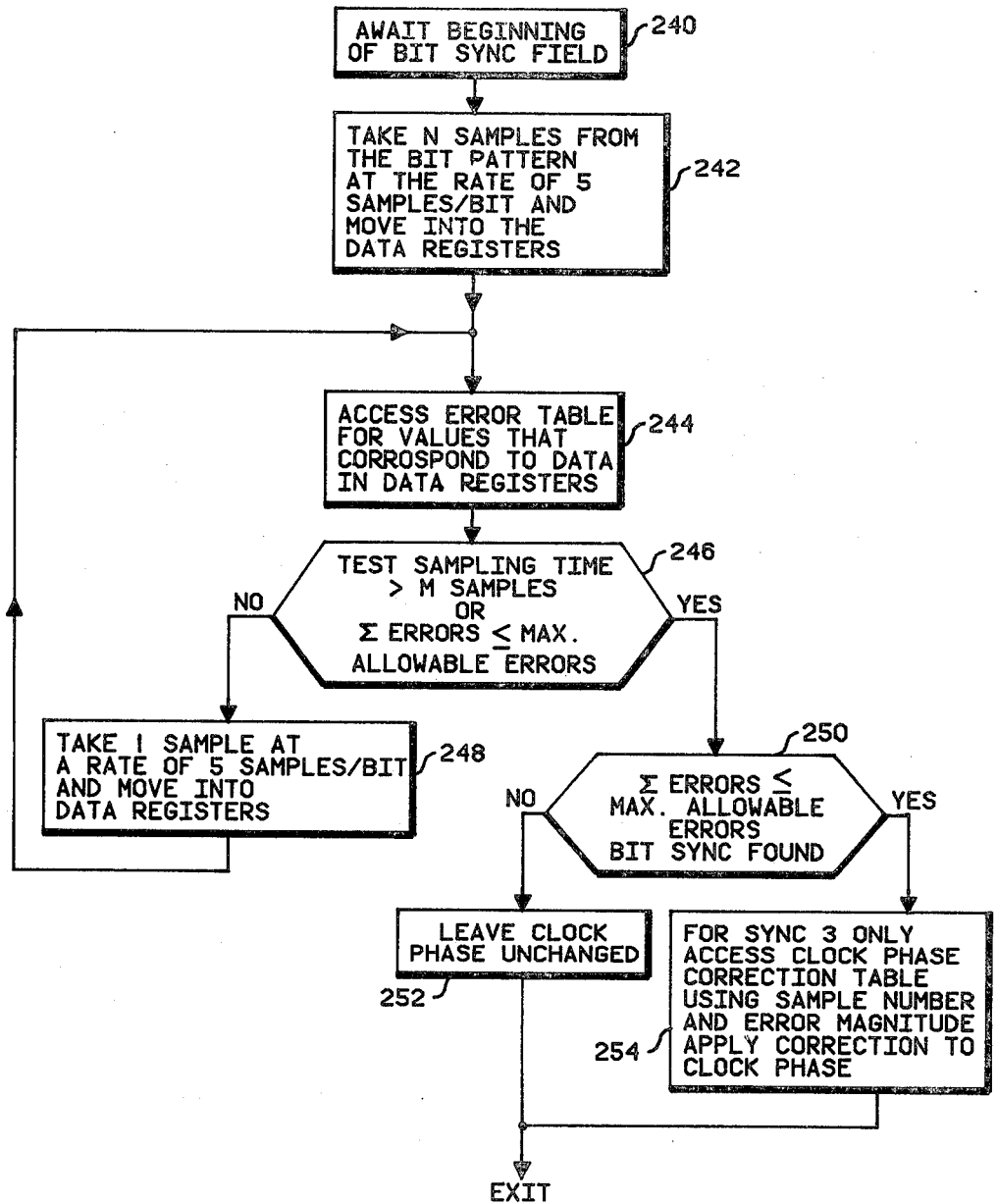
FIG. 8 is a detailed flowchart of the synchronization subprogram for the alternative embodiment of the invention.

FIG. 8 shows the flowchart for the SYNC 3 module which comprises the firmware alternative embodiment for the synchronization system. The first block in the diagram designated 240 shows the function of awaiting the beginning of the repetitive $\emptyset$-1 synchronization field. Reference is made to FIG. 6 where the message coding format is shown. Control of the program operation is then transferred to block 242 which describes the operation of taking at the specified rate a number of samples form the $\emptyset$-1 pattern and moving this information into the data registers which are the equivalent of the serial shift registers. This operation may be more clearly understood by making reference to FIG. 4 which shows a correlator which serves both as a hardware implementation and as a functional diagram for the present firmware alternative embodiment for the correlator.

After taking the samples, control of the program function is transferred to block 244 so that the error table may be accessed for the value of the predetermined information that corresponds to the binary sequences of the data in the data registers. As has been previously described, the error information is listed in Table II. Control is then transferred to decision block 246 which tests whether the sampling time is greater than M samples or the summation of the errors is less than the maximum allowable errors. While the flowchart in FIG. 8 has been written generally for a SYNC 3 module, in particular the M samples may correspond to 40 bit samples and therefore the sampling time is tested for whether or not the time is greater than that required for 40 samples. Also the maximum number of errors is usually designated as less than or equal to four. With these numbers inserted into the flowchart, a more complete description of the operation of the firmware alternative embodiment of the synchronization scheme is obtained.

In the event that the decision from block 246 is no, transfer of control to functional block 248 again takes one sample at the specified rate and moves it into the data registers transferring the control back to functional block 244. Assuming the decision from decision block 246 is yes, in that more than 40 samples have been taken or that the summation of errors is less than the acceptable amount of four for determining correlation, control is transferred to the decision block 250 to determine whether the summation of the errors is less than four and that therefore bit synchronization has been found. In the event that bit synchronization has not been found, control of the program operation is transferred to block 252 which leaves the variable phase clock unchanged and causes an exit from the subroutine back to the main line program. In the event that the output of the decision block 250 is yes, that bit synchronization has indeed been found, the clock phase corrector table is accessed using the sample number and error magnitude to apply two dimensional corrections to the clock phase (block 254). In this case, for the alternative embodiment Table III contains this information.

TABLE III

|  |  | ERROR MAGNITUDE | | | | |
|---|---|---|---|---|---|---|
|  |  | 0 | 1 | 2 | 3 | 4 |
| SAMPLE | 0 | 28 | 23 | 18 | 13 | 8 |
| NO. | 1 | 28 | 27 | 26 | 25 | 24 |
|  | 2 | 28 | 28 | 28 | 28 | 28 |
|  | 3 | 28 | 29 | 30 | 31 | 32 |
|  | 4 | 28 | 33 | 38 | 43 | 48 |

Table III contains the information in matrix form correlating the sample position and the error magnitude showing the number of clock cycles for the variable phase clock. Reference should be made, again, to the correlator shown in FIG. 4 and the type of phase clock shown in FIG. 3B to fully comprehend the operation of these factors. The independent variables of the correlator error magnitude and sample number access in matrix fashion a number contained in this table which corresponds to the appropriate timing for the variable phase clock. In particular, it may be seen that for the column of information corresponding to error magnitude 0 and the row of information corresponding to sample number 2 all contain the same magnitude of correction. This is, in effect, no correction to the variable phase clock but is a preferred magnitude for its normal operation. Thus, 28 internal clocking periods would normally designate an adjustment in the variable phase clock to the center of the next bit interval. It may be observed that as the error magnitude goes up or as the sample number deviates from the 2 position (the sample which corresponds to the center of the anticipated bit interval) varies the magnitude of the correction supplied to the variable phase clock.

To complete the detailed description of the alternative embodiment for the synchronization apparatus, a program table is included with the detailed information which the alternative embodiment employs. The alternative embodiment comprises a firmware synchronization system contained within the firmware for decoding the message coding scheme of FIG. 6. Table IV is a memory core dump of this entire firmware program which operates in conjunction with a microprocessor. The main functional operation of this program is described by flowchart of FIGS. 7A and 7B which shows the operation for decoding message coding scheme of FIG. 6. The program modules designated in the flowchart are also shown in FIG. 4 as being contained in ROM 212. More information is contained in the core dump of the program than is shown by the flowchart since the program core dump includes certain test modes and other operations that are not pertinent to the description of the alternative embodiment of this invention.

TABLE IV

| 0800 | 07 | 3A | 04 | 3F | 4C | 3F | 4D | AE | 1F | 3C | 39 | CD | 0C | 7E | 5A | 26 |
|---|---|---|---|---|---|---|---|---|---|---|---|---|---|---|---|---|
| 0810 | FA | 00 | 4F | 40 | AE | 00 | 98 | B6 | 44 | B8 | 3C | A4 | 7F | 27 | 02 | 99 |
| 0820 | 97 | B6 | 45 | B8 | 3D | 27 | 04 | 25 | 2B | 99 | 97 | B6 | 46 | B8 | 3E | 27 |
| 0830 | 04 | 25 | 21 | 99 | 97 | B6 | 47 | B8 | 3F | 27 | 03 | 25 | 17 | 97 | AD | 79 |
| 0840 | 2A | 12 | 0E | 4B | 04 | 3D | 48 | 0B | A6 | 01 | CD | 08 | D4 | A6 | 03 |
| 0850 | B7 | 48 | 20 | 40 | 02 | 4F | 3D | AE | 00 | 98 | B6 | 44 | B8 | 40 | A4 | 7F |
| 0860 | 27 | 02 | 99 | 97 | B6 | 45 | B8 | 41 | 27 | 04 | 25 | 28 | 99 | 97 | B6 | 46 |
| 0870 | B8 | 42 | 27 | 04 | 25 | 1E | 99 | 97 | B6 | 47 | B8 | 43 | 27 | 03 | 25 | 14 |
| 0880 | 97 | AD | 36 | 2A | 0F | 0E | 4B | 04 | B6 | 49 | 26 | 08 | A6 | 02 | AD | 44 |
| 0890 | A6 | 03 | B7 | 49 | 3A | 3A | 26 | 17 | B6 | 4C | 26 | 04 | A6 | 02 | 20 | 02 |
| 08A0 | A6 | 03 | BE | 48 | 27 | 02 | 3A | 48 | 3D | 49 | 27 | 02 | 3A | 49 | 81 | B6 |
| 08B0 | 4C | 27 | 03 | A6 | 01 | 81 | A6 | 00 | 81 | A6 | 00 | 57 | A9 | 00 | 57 | A9 |
| 08C0 | 00 | 57 | A9 | 00 | 57 | A9 | 00 | 57 | A9 | 00 | 57 | A9 | 00 | 57 | A9 | 00 |
| 08D0 | 57 | A9 | FE | 81 | BE | 4C | 26 | 03 | B7 | 4C | 81 | B1 | 4C | 27 | 02 | B7 |
| 08E0 | 4D | 81 | 01 | 4C | 42 | B6 | 3A | A1 | 03 | 23 | 12 | CD | 0D | 40 | B6 | 3A |
| 08F0 | A0 | 04 | 27 | 30 | A1 | 04 | 26 | 05 | CD | 0D | 40 | 20 | 27 | A0 | 02 | 27 |
| 0900 | 0A | 24 | 10 | CD | 0C | A7 | CD | 0D | 53 | 20 | 19 | CD | 0C | 9C | CD | 0D |
| 0910 | 59 | 20 | 11 | 8F | A6 | 02 | 4A | 26 | FD | 7D | A6 | FB | AE | 3A | CD | 0D |
| 0920 | 63 | CD | 0C | 93 | A6 | 00 | 81 | CD | 0C | A7 | CD | 0D | 5F | 3A | 3A | 26 |
| 0930 | F6 | 20 | F1 | A6 | 1C | B7 | 23 | A6 | F3 | B7 | 22 | C6 | 00 | 4C | 26 | 03 |
| 0940 | CC | 09 | CD | AD | 40 | 01 | 24 | 03 | CC | 09 | CD | CD | 0C | A7 | 16 | 01 |
| 0950 | 16 | 01 | 16 | 01 | 3F | 01 | B6 | 39 | 4C | A1 | 87 | 25 | 02 | A0 | 87 | B7 |
| 0960 | 39 | 0F | 01 | E7 | AE | 03 | CD | 0C | 9C | 16 | 01 | 16 | 01 | 16 | 01 | 3F |
| 0970 | 01 | 5A | 26 | F2 | B6 | 39 | AB | 06 | A1 | 87 | 25 | 02 | A0 | 87 | B7 | 39 |
| 0980 | C6 | 00 | 4D | 27 | 48 | B7 | 21 | B6 | 21 | A1 | 01 | 26 | 05 | CD | 0D | 40 |
| 0990 | 20 | 0F | A6 | 04 | B7 | 20 | 99 | CD | 0C | A7 | CD | 0D | 5F | 3A | 20 | 26 |
| 09A0 | F6 | 39 | 24 | B6 | 39 | AB | 04 | B7 | 39 | A0 | 87 | 27 | 02 | 25 | 13 | B7 |
| 09B0 | 39 | CD | 0A | EB | C6 | 00 | 48 | 27 | 02 | 3A | 48 | C6 | 00 | 49 | 27 | 02 |
| 09C0 | 3A | 49 | 01 | 24 | 08 | 3C | 23 | 26 | BE | 3C | 22 | 26 | BA | A6 | 00 | 81 |
| 09D0 | 9B | A6 | 60 | B7 | 04 | A6 | 0F | B7 | 05 | 3F | 09 | 1D | 00 | A6 | 0B | B7 |
| 09E0 | 01 | 14 | 01 | 15 | 01 | 3F | 01 | 14 | 01 | 15 | 01 | 3F | 01 | 16 |
| 09F0 | 01 | 16 | 01 | 16 | 01 | 3F | 01 | 0F | 01 | F5 | 5F | 5A | 26 | FD | 0F | 01 |
| 0A00 | EE | CD | 0C | 93 | CD | 0A | EB | 1A | 04 | 1B | 00 | CD | 0A | EB | CD | 0D |
| 0A10 | 40 | 25 | F8 | 1B | 04 | 3F | 39 | 3F | 48 | 3F | 49 | CD | 0C | B2 | 3F | 4A |
| 0A20 | 08 | 01 | 02 | 3A | 4A | B6 | 01 | A4 | 60 | 3F | 4B | A1 | 60 | 27 | 07 | 1E |
| 0A30 | 4B | 4D | 26 | 02 | 1C | 4B | A6 | 00 | 0A | 01 | 02 | A6 | 01 | 81 | B6 | 39 |
| 0A40 | AB | 10 | B7 | 39 | A6 | 10 | B7 | 38 | A6 | FE | B7 | 37 | 20 | 1C | B6 | 39 |
| 0A50 | AB | 12 | B7 | 39 | A6 | D2 | B7 | 38 | A6 | FD | B7 | 37 | 20 | 0C | 3C | 39 |
| 0A60 | 3C | 39 | A6 | 69 | B7 | 38 | A6 | EF | B7 | 37 | A6 | 02 | B7 | 30 | A6 | FF |
| 0A70 | B7 | 28 | 1A | 04 | 1B | 00 | AD | 73 | CD | 0B | 0B | CD | 0B | 17 | 26 | 37 |
| 0A80 | A6 | 1F | 4A | 26 | FD | CD | 0C | 93 | 1B | 04 | CD | 0B | 0B | 3F | 46 | 3F |
| 0A90 | 47 | B6 | 37 | 26 | 04 | B6 | 38 | 27 | 19 | B6 | 46 | A8 | 44 | A4 | 7F | 26 |
| 0AA0 | 06 | B6 | 47 | A8 | D7 | 27 | 15 | CD | 0C | 7E | 3C | 38 | 26 | EB | 3C | 37 |
| 0AB0 | 26 | E7 | 1B | 04 | A6 | 01 | 81 | 1B | 04 | A6 | 00 | 81 | AE | 07 | A6 | 01 |
| 0AC0 | B7 | 39 | CD | 0C | 7E | 5A | 26 | FA | 0C | 4B | 0D | B6 | 47 | B8 | 3B | A4 |
| 0AD0 | 7F | 27 | 05 | 1B | 04 | A6 | 0A | B7 | 2E | B7 | 2F | A6 | 03 |
| 0AE0 | B7 | 27 | A6 | 08 | B7 | 3A | 1B | 04 | A6 | 03 | 81 | 16 | 01 | 14 | 01 | 14 |
| 0AF0 | 01 | 09 | 00 | 00 | 15 | 01 | 3F | 01 | 25 | 10 | 1C | 00 | 16 | 01 | 1C | 00 |

TABLE IV-continued

| | | | | | | | | | | | | | | | |
|---|---|---|---|---|---|---|---|---|---|---|---|---|---|---|---|
| 0B00 | 9D | 9D | 1D | 00 | 3F | 01 | 1D | 00 | 20 | F0 | 81 | AE | 04 | A6 | 0E | E7 |
| 0B10 | 29 | E7 | 31 | 5A | 2A | F9 | 81 | 1B | AE | 04 | BF | 36 | 16 | 01 | B6 | 00 |
| 0B20 | B8 | 4A | 48 | 69 | 31 | EE | 31 | D6 | 0E | BA | 3F | 01 | BE | 36 | E7 | 29 |
| 0B30 | B6 | 29 | BB | 2A | BB | 2B | BB | 2C | BB | 2D | 0E | 28 | 04 | 3A | 28 | 20 |
| 0B40 | 05 | 9D | B1 | 30 | 23 | 22 | 5A | 2B | 0B | D6 | 0B | 49 | D6 | 0B | 4C | D6 |
| 0B50 | 0B | 4F | 20 | C6 | AE | 04 | 9D | 3C | 38 | 27 | 03 | 9D | 20 | 02 | 3C | 37 |
| 0B60 | 26 | B8 | A6 | DE | CD | 0C | 95 | 81 | BB | 36 | 38 | 36 | 38 | 36 | BB | 36 |
| 0B70 | 97 | D6 | 0B | 71 | 4F | 81 | A6 | F8 | B7 | 38 | A6 | FF | B7 | 37 | 3F | 47 |
| 0B80 | 3F | 46 | 1A | 04 | 1B | 00 | A6 | 04 | B7 | 30 | A6 | 22 | B7 | 28 | 8F | CD |
| 0B90 | 0B | 18 | 26 | 0E | D6 | 0E | 00 | 4A | 26 | FD | CD | 0C | 93 | CD | 0C | 80 |
| 0BA0 | 20 | 05 | 36 | 31 | CD | 0C | 87 | 1B | 04 | CD | 0A | EB | A6 | 01 | B7 | 39 |
| 0BB0 | CD | 0B | 0B | AE | 10 | CD | 0C | 7E | B6 | 46 | A8 | 44 | A4 | 7F | 26 | 0F |
| 0BC0 | B6 | 47 | A8 | D7 | 26 | 09 | CD | 0C | 7E | A6 | 0B | B7 | 2E | 20 | 03 | 5A |
| 0BD0 | 26 | E3 | AE | 06 | CD | 0C | 7E | 5A | 26 | FA | 0C | 4B | 08 | B6 | 47 | B8 |
| 0BE0 | 3B | A4 | 7F | 26 | 04 | A6 | 0B | B7 | 2F | A6 | 08 | B7 | 3A | 3A | 2F | 27 |
| 0BF0 | 10 | 3A | 2E | 27 | 0C | B6 | 2F | A1 | 0A | 26 | 03 | A6 | 03 | 81 | A6 | 02 |
| 0C00 | 81 | A6 | 01 | 81 | 14 | 01 | 3F | 01 | A6 | 07 | B7 | 01 | 3F | 01 | B6 | 39 |
| 0C10 | A1 | 85 | 23 | 04 | A0 | 87 | B7 | 39 | CD | 0C | 9C | 16 | 01 | 16 | 01 | 16 |
| 0C20 | 01 | 3F | 01 | 3C | 39 | 3C | 39 | B6 | 39 | A1 | 83 | 23 | EB | 16 | 01 | 16 |
| 0C30 | 01 | 16 | 01 | 3F | 01 | 00 | 39 | 03 | CD | 0C | A7 | CD | 0C | A7 | 16 | 01 |
| 0C40 | 16 | 01 | 16 | 01 | 3F | 01 | A6 | 0B | B7 | 01 | 14 | 01 | 01 | 15 | 01 | 3F | 01 |
| 0C50 | 16 | 01 | 14 | 01 | 15 | 01 | 3F | 01 | 1A | 04 | 1B | 00 | CD | 0C | B2 | 3F |
| 0C60 | 4A | 08 | 01 | 02 | 3A | 4A | AE | 1F | CD | 0C | 7E | 5A | 26 | FA | 3F | 39 |
| 0C70 | A6 | 00 | 81 | A3 | F8 | CD | 0C | 7E | 5A | 26 | FA | A6 | 00 | 81 | AD | 12 |
| 0C80 | B6 | 00 | 16 | 01 | B8 | 4A | 48 | 39 | 46 | 39 | 45 | 39 | 44 | 3F |
| 0C90 | 01 | 81 | 8F | A6 | E5 | B7 | 08 | A6 | 09 | B7 | 09 | 81 | 8F | 7D | A6 | EF |
| 0CA0 | B7 | 08 | A6 | 0F | B7 | 09 | 81 | 8F | A6 | 06 | 4A | 26 | FD | 7D | 4F | CC |
| 0CB0 | 0D | 4A | AE | 07 | D6 | 0D | 02 | B7 | 01 | B6 | 00 | 3F | 01 | 46 | 36 | 40 |
| 0CC0 | 46 | 36 | 41 | 46 | 36 | 3C | 46 | 36 | 3D | 46 | 36 | 3B | 5A | 2A | E5 | 3F |
| 0CD0 | 4F | B6 | 3D | 26 | 06 | BE | 3C | 26 | 02 | 10 | 4F | BE | 3C | AD | 2B | 34 |
| 0CE0 | 3C | 36 | 3D | 56 | 46 | B7 | 3F | BF | 3E | B6 | 41 | 26 | 06 | BE | 40 | 26 |
| 0CF0 | 02 | 12 | 4F | BE | 40 | AD | 13 | 34 | 40 | 36 | 41 | 56 | 46 | B7 | 43 | BF |
| 0D00 | 42 | 81 | 0E | 0D | 0A | 09 | 06 | 00 | 0D | 01 | BF | 44 | B7 | 45 | AE | 07 |
| 0D10 | 3F | 46 | 3F | 47 | 34 | 45 | 24 | 0E | B6 | 46 | D8 | 0F | D2 | B7 | 46 | B6 |
| 0D20 | 47 | D8 | 0F | CA | B7 | 47 | 34 | 44 | 24 | 0E | B6 | 46 | D8 | 0F | C2 | B7 |
| 0D30 | 46 | B6 | 47 | D8 | 0F | BA | B7 | 47 | 5A | 2A | D9 | BE | 46 | B6 | 47 | 81 |
| 0D40 | 8F | 7D | 4A | A6 | FB | AE | 2B | 99 | AD | 19 | A6 | EE | B7 | 08 | A6 | 0E |
| 0D50 | B7 | 09 | 81 | A6 | FE | AE | 72 | 20 | 0A | A6 | FC | AE | D5 | 20 | 04 | A6 |
| 0D60 | FF | AE | 2C | B7 | 50 | 46 | 1C | 00 | B4 | 01 | 1C | 00 | 3F | 01 | 1D | 00 |
| 0D70 | 5C | 27 | 04 | 16 | 01 | 20 | EF | 3C | 50 | 26 | EB | 48 | 81 | 3F | 04 | 0D |
| 0D80 | 00 | 57 | A6 | FF | B7 | 04 | 3F | 05 | A6 | 01 | B7 | 00 | B7 | 01 | 26 | FE |
| 0D90 | 48 | 24 | F7 | 3F | 04 | A6 | FF | B7 | 05 | A6 | 80 | B7 | 01 | B1 | 00 | 26 |
| 0DA0 | FE | 44 | 26 | F7 | AE | 10 | A6 | 01 | F7 | F1 | 26 | FE | 78 | 48 | 24 | F9 |
| 0DB0 | 5C | 2A | F3 | AE | 08 | D6 | 0D | D1 | E7 | 10 | 5A | 26 | F8 | 5F | 4F | BD |
| 0DC0 | 11 | 3C | 12 | 26 | FA | 4D | 26 | FE | 3F | 04 | A6 | 01 | B7 | 05 | 3C | 01 |
| 0DD0 | 20 | FC | D8 | F8 | 00 | 5C | 26 | FA | 81 | AE | 00 | BF | 51 | DD | 0E | 1D |
| 0DE0 | BB | 51 | 97 | DE | 0E | 19 | 20 | F3 | A6 | 60 | B7 | 09 | 80 | 00 | 00 | 00 |
| 0DF0 | 00 | 00 | 00 | 00 | 00 | 00 | 00 | 00 | 00 | 00 | 00 | 00 | 00 | 00 | 00 | 00 |
| 0E00 | 1C | 17 | 12 | 0D | 08 | 1C | 1B | 1A | 19 | 18 | 1C | 1C | 1C | 1C | 1C | 1C |
| 0E10 | 1D | 1E | 1F | 20 | 1C | 21 | 26 | 2B | 30 | 07 | 46 | 00 | 00 | CC | 09 | D0 |
| 0E20 | 70 | 70 | 0E | 0E | CC | 0A | 3E | 70 | 70 | 0E | 15 | CC | 0A | 5E | 15 | 15 |
| 0E30 | 77 | 1C | CC | 08 | 00 | 23 | 00 | 00 | 00 | CC | 0C | 04 | 00 | 70 | 1C | 2A |
| 0E40 | CC | 0B | 76 | 31 | 00 | 00 | 00 | CC | 09 | 33 | 38 | 00 | 00 | 00 | CC | 0C |
| 0E50 | 04 | 00 | 70 | 3F | 3F | CC | 0B | 76 | 3F | 3F | 31 | 2A | CC | 08 | 00 | 46 |
| 0E60 | 46 | 4D | 4D | CC | 0A | 4E | 46 | 46 | 4D | 85 | CC | 0A | 5E | 54 | 5B | 62 |
| 0E70 | 62 | CC | 08 | 00 | 62 | 00 | 00 | 00 | CC | 08 | E2 | 00 | 46 | 54 | 54 | CC |
| 0E80 | 0B | 76 | 9A | 00 | 00 | 00 | CC | 0C | 73 | 00 | 00 | 00 | 00 | CC | 0C | 04 |
| 0E90 | 7E | 00 | 00 | 00 | CC | 0C | 04 | 00 | 70 | 77 | 3F | CC | 0B | 76 | 85 | 85 |
| 0EA0 | 9A | 8C | CC | 08 | 00 | 00 | 46 | 93 | 5B | CC | 0B | 76 | 8C | 00 | 00 | 00 |
| 0EB0 | CC | 0C | 73 | 00 | 46 | 69 | 54 | CC | 0B | 76 | 01 | 01 | 01 | 02 | 01 | 01 |
| 0EC0 | 03 | 02 | 01 | 04 | 06 | 05 | 03 | 02 | 05 | 01 | 01 | 02 | 04 | 02 | 02 | 01 |
| 0ED0 | 02 | 01 | 04 | 02 | 05 | 01 | 02 | 01 | 01 | 01 | 02 | 02 | 03 | 02 | 02 | 03 |
| 0EE0 | 04 | 03 | 02 | 05 | 07 | 06 | 04 | 03 | 06 | 02 | 02 | 03 | 05 | 03 | 03 | 02 |
| 0EF0 | 03 | 02 | 05 | 03 | 06 | 02 | 03 | 02 | 02 | 02 | 01 | 00 | 01 | 01 | 01 | 00 |
| 0F00 | 02 | 01 | 00 | 03 | 05 | 04 | 01 | 04 | 00 | 01 | 00 | 03 | 01 | 00 | 00 | 00 |
| 0F10 | 01 | 00 | 03 | 01 | 04 | 03 | 01 | 00 | 03 | 01 | 01 | 01 | 02 | 01 | 02 |
| 0F20 | 03 | 02 | 01 | 04 | 06 | 05 | 03 | 02 | 05 | 01 | 01 | 02 | 04 | 02 | 02 | 01 |
| 0F30 | 02 | 01 | 04 | 02 | 05 | 01 | 02 | 01 | 01 | 01 | 02 | 02 | 03 | 02 | 03 |
| 0F40 | 04 | 03 | 02 | 05 | 07 | 06 | 04 | 03 | 06 | 02 | 02 | 03 | 05 | 03 | 03 | 02 |
| 0F50 | 03 | 02 | 05 | 03 | 06 | 02 | 03 | 02 | 02 | 02 | 03 | 03 | 03 | 04 | 03 | 04 |
| 0F60 | 05 | 04 | 03 | 06 | 08 | 07 | 05 | 04 | 07 | 03 | 03 | 04 | 06 | 04 | 04 | 03 |
| 0F70 | 04 | 03 | 06 | 04 | 07 | 03 | 04 | 03 | 03 | 03 | 01 | 01 | 01 | 02 | 01 | 02 |
| 0F80 | 03 | 02 | 01 | 04 | 06 | 05 | 03 | 02 | 05 | 01 | 01 | 02 | 04 | 02 | 02 | 01 |
| 0F90 | 02 | 01 | 04 | 02 | 05 | 01 | 02 | 01 | 01 | 01 | 02 | 02 | 03 | 02 | 02 | 03 |
| 0FA0 | 04 | 03 | 02 | 05 | 07 | 06 | 04 | 03 | 06 | 02 | 02 | 03 | 05 | 03 | 03 | 02 |
| 0FB0 | 03 | 02 | 05 | 03 | 06 | 02 | 03 | 02 | 02 | 02 | AE | 78 | 3C | 1E | A0 | 50 |
| 0FC0 | A8 | D4 | 8F | C8 | 64 | 32 | 96 | 4B | 25 | 12 | 6A | 1A | 22 | BE | F0 | 78 |
| 0FD0 | BC | 5E | 09 | 8B | CA | EA | FA | 7D | 3E | 1F | 00 | 00 | 00 | 00 | 00 | 00 |
| 0FE0 | 00 | 00 | 00 | 00 | 00 | 00 | 00 | 00 | 00 | 00 | 00 | 00 | 00 | 00 | 00 | 97 |
| 0FF0 | 00 | 00 | 00 | 00 | 00 | 00 | 0D | E8 | 0D | E8 | 0D | 7D | 0D | 7D | 0D | A6 |

While specific embodiments of this invention have been shown and described, further modifications and improvements will occur to those skilled in the art. All modifications which retain the basic underlying principles disclosed and claimed herein are within the scope of this invention.

We claim:

1. A signal synchronization system comprising:
   means for providing first and second signals for comparative evaluation;
   pattern analyzing means receiving said first and second signals and producing a control signal in response thereto, said control signal being related to the dissimilarity between said first and second signals;
   timing means producing repetitive timing signals;
   local signal means producing output signals; and
   adjustment means coupled to said local signal means and responsive to said control signal from said pattern analyzing means and to said timing signals from said timing means, for advancing or retarding the time occurrence of said output signals of said local signal means, be incrementally applying predetermined values as a function of the magnitude of said control signal and a discrete serial timing interval formed said timing signals.

2. The signal synchronization system of claim 1 further including means for measuring said magnitude of dissimilarity during a corresponding discrete serial timing interval.

3. The signal synchronization system of claim 2 where said pattern analyzing means comprises a signal correlator, said first signal contains digitally encoded information said second signal is a reference signal, said system further including receiving means coupled to said signal correlator for receiving and detecting said digitally encoded signal and memory means for retaining said reference signal.

4. A signal synchronization system comprising:
   receiving means for detecting digitally encoded signals transmitted at a predetermined rate over a communication channel;
   a local clock producing timing signals to establish repetitive sampling periods serially related in time;
   differential pattern analysis means, responsive to said receiving means and said local clock, producing an output signal for each said sampling period, corresponding to the magnitude of dissimilarity between said detected digitally encoded signals and a predetermined reference signal; and
   adjustment means coupled to said local clock and said differential pattern analysis means, responsive to the serial time position of said sampling period and the magnitude of dissimilarity between said detected digitally encoded signals and said predetermined reference signal, for adjusting the occurrence of said timing signals of said local clock.

5. The synchronization system of claim 4 wherein said local clock further includes means for serially ordering and establishing said sampling periods in predesignated groups of equal size.

6. The synchronization system of claim 5 wherein said differential pattern analysis means further includes memory means for storing said predetermined reference signal.

7. The synchronization system of claim 6 wherein said detected digitally encoded signals and said predetermined reference signal each comprise sequences of binary digits and said differential pattern analysis means further includes means for measuring the magnitude of dissimilarity between said binary sequences.

8. The synchronization system of claim 7 wherein said differential pattern means further includes means for retaining detected digitally encoded sequences more than one sampling period for accumulating historical data for the measurement of said sequence dissimilarity.

9. The synchronization system of claim 8 wherein said adjustment means further includes addressable matrix memory means accessed by the serial position of a sampling period within a predesignated group and the magnitude of the dissimilarity of said detected and reference sequences, said matrix memory means producing a signal containing information related to the magnitude and direction of the adjustment to be applied to said local clock timing signals.

10. The synchronization system of claim 9 wherein said adjustment further includes sequence difference range means which inhibits any adjustments from being applied to said clock signals unless said detected difference between said sequences is within a predetermined range.

11. A signal synchronization system comprising:
    receiving means for detecting digitally encoded signals transmitted at a predetermined rate over a communication channel;
    local clock means producing timing signals at a frequency equal to an integral number multiple of the predetermined digitally encoded signal rate to establish repetitive sampling periods, said periods being grouped into said integral number of periods and serially ordered, to provide an integral number of time periods during an anticipated digit interval;
    sampling means coupled to said receiving means and said local clock means and responsive to said timing signals, for sampling and decoding said digitally encoded signals during each serially ordered sampling period, said sampling means including means for storing sequences of said decoded signals;
    memory means containing a reference sequence of digitally encoded signals;
    correlation means, coupled to said sampling means and said memory means, producing a signal related to the difference between the sequences of said decoded signals and said reference sequence; and
    adjustment means coupled to said local clock means and said correlation means, and responsive both to the serial position of said ordered sampling period within a group and the magnitude of the difference between the sequence of said decoded signals and said reference sequence, to adjust the occurrence of the timing signals of said local clock means.

12. The synchronization system of claim 11 wherein said detected digitally encoded signals and said predetermined reference signal each comprise sequences of binary digits and said correlation means further includes means for measuring the magnitude of dissimilarity between said binary sequences.

13. The synchronization system of claim 12 wherein said correlation means further includes means for retaining detected binary encoded sequences more than one sampling period thereby accumulating historical data for the measurement of said sequence dissimilarity.

14. The synchronization system of claim 13 wherein said adjustment means further includes addressable matrix memory means accessed by the serial position of a sampling period within a group and the magnitude of the dissimilarity of said detected and reference sequences, producing a signal containing predetermined information related to the magnitude and direction of the correction to be applied to said local clock timing signals.

15. The synchronization system of claim 14 wherein said adjustment further includes sequence difference range means which inhibits any adjustments from being applied to said clock signals unless said detected difference between said sequences is within a predetermined range.

16. The synchronization system of claim 15 wherein said binary encoded signals for synchronization comprise a sequence of alternative magnitude binary digits and said integral multiple is an odd integer, thereby establishing one sampling period in the center of an anticipated bit interval.

* * * * *